United States Patent
Wach

(10) Patent No.: US 8,611,747 B1
(45) Date of Patent: Dec. 17, 2013

(54) METHOD AND SYSTEM FOR MULTIPLEXING OPTICAL COMMUNICATION SIGNALS

(75) Inventor: Michael L. Wach, Alpharetta, GA (US)

(73) Assignee: Cirrex Systems, LLC, Wilmington, DE (US)

(*) Notice: Subject to any disclaimer, the term of this patent is extended or adjusted under 35 U.S.C. 154(b) by 620 days.

(21) Appl. No.: 12/800,555

(22) Filed: May 18, 2010

Related U.S. Application Data

(60) Provisional application No. 61/216,524, filed on May 18, 2009.

(51) Int. Cl.
   *H04J 14/02* (2006.01)

(52) U.S. Cl.
   USPC .................... 398/79; 398/82; 398/85

(58) Field of Classification Search
   USPC ............... 398/68, 76–79, 82–89
   See application file for complete search history.

(56) References Cited

U.S. PATENT DOCUMENTS

| | | | |
|---|---|---|---|
| 6,052,495 A | 4/2000 | Little et al. | |
| 6,393,186 B1 | 5/2002 | Deacon | |
| 2002/0067525 A1* | 6/2002 | Sakamoto et al. | 359/124 |
| 2003/0002102 A1* | 1/2003 | Khalfallah et al. | 359/124 |
| 2003/0185255 A1* | 10/2003 | Ye et al. | 372/18 |
| 2006/0104639 A1* | 5/2006 | Zami et al. | 398/79 |
| 2007/0002327 A1* | 1/2007 | Zhou et al. | 356/456 |
| 2007/0222654 A1* | 9/2007 | Vrazel et al. | 341/144 |
| 2008/0159340 A1* | 7/2008 | Daiber et al. | 372/20 |
| 2008/0193133 A1* | 8/2008 | Krug et al. | 398/83 |
| 2010/0226395 A1* | 9/2010 | Jiang et al. | 372/6 |

OTHER PUBLICATIONS

"APSS Apollo Application Note on Micro Ring Resonator" Apollo Photonics, Jun. 15, 2003, retrieved from www.apollophotonics.com, 24 pages.

\* cited by examiner

*Primary Examiner* — Dzung Tran
(74) *Attorney, Agent, or Firm* — Fahmi, Sellers, Embert & Davitz

(57) ABSTRACT

An optical waveguide can transmit multiple optical signals imprinted or encoded with different information, thereby increasing the waveguide's information carrying capability or bandwidth. Each optical signal can comprise multiple longitudinal modes that are energized and that are modulated substantially in unison. Thus, the photonic energy of each optical signal can be spread across a wavelength region in a substantially discrete or substantially discontinuous pattern. The respective wavelength regions of the optical signals can overlap or substantially overlay one another. Modes of one of the optical signals can be substantially interleaved, interspersed, or intermingled with modes of other optical signals. Systems at ends of the optical waveguide can feed the optical signals onto and off of the optical waveguide and discriminate the optical signals from one another. The systems can comprise ring resonators. The waveguide can support an on-chip network, such as for a multicore processor of a computer.

17 Claims, 14 Drawing Sheets

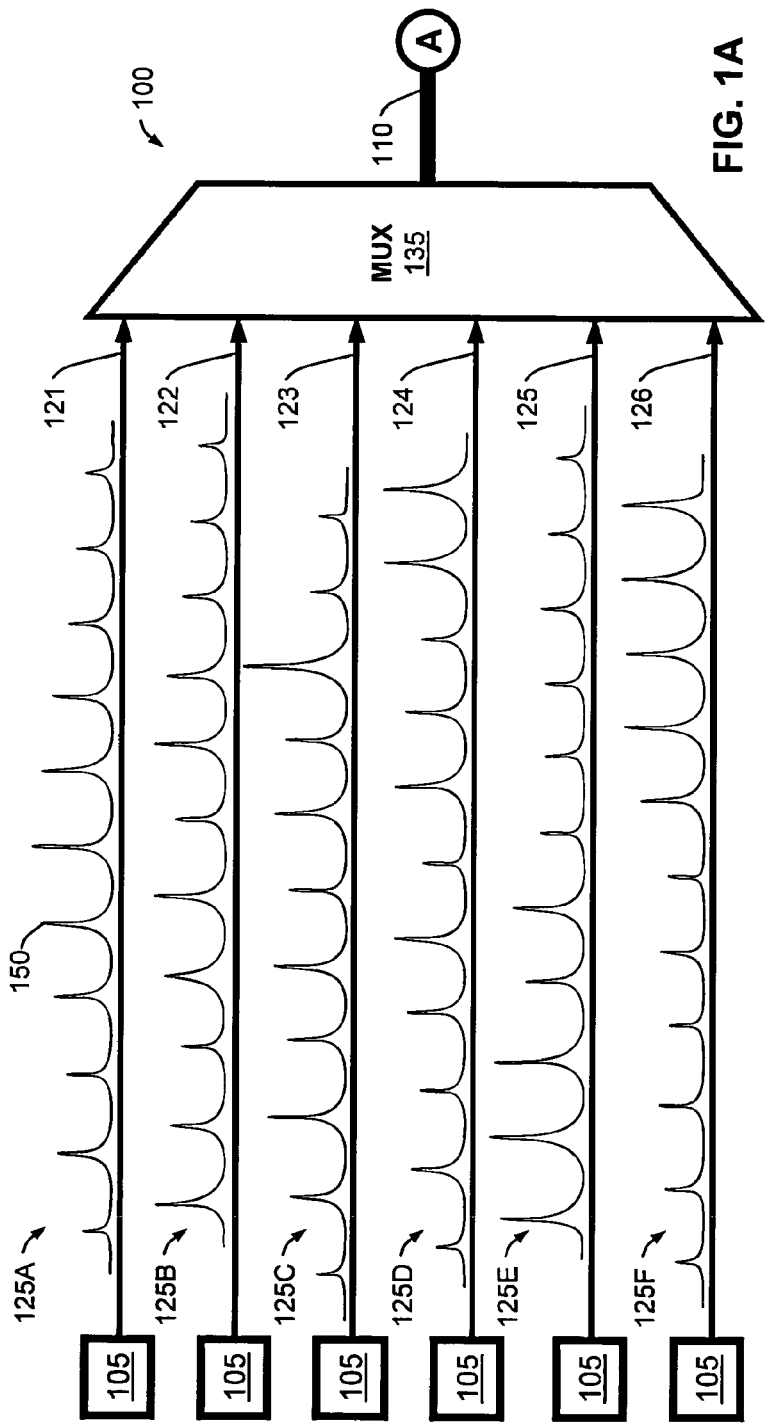
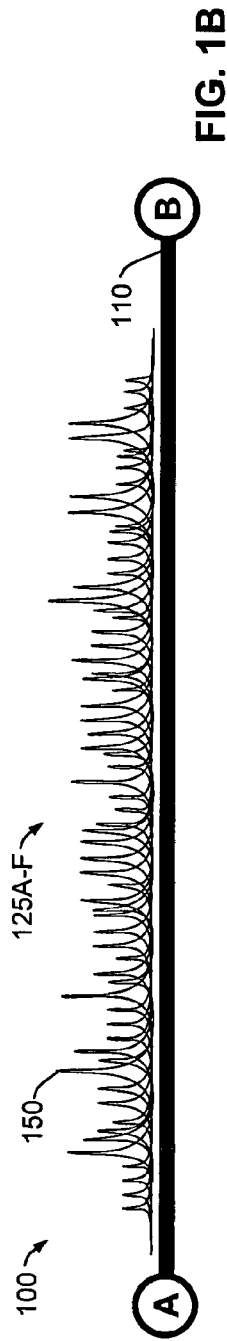
FIG. 1A
FIG. 1B

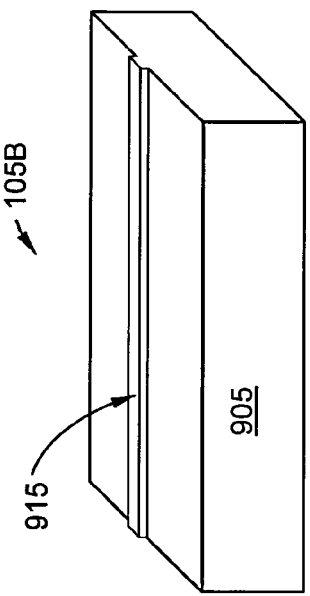
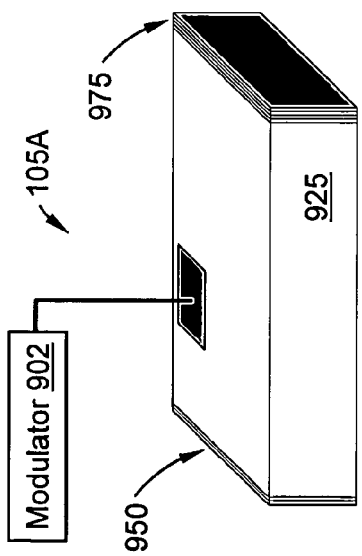
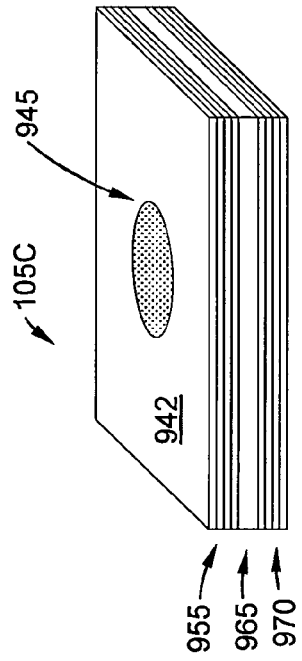

METHOD AND SYSTEM FOR MULTIPLEXING OPTICAL COMMUNICATION SIGNALS

CROSS REFERENCE TO RELATED APPLICATIONS

This application claims priority to U.S. Provisional Patent Application No. 61/216,524 filed May 18, 2009 in the name of Wach and entitled "Method and System for Multiplexing Optical Communication Signals," the entire contents of which are incorporated herein by reference.

TECHNICAL FIELD

The present technology relates generally to multiplexing optical communication signals and more particularly to transmitting two or more optical signals on a common waveguide. Each optical signal can be encoded with distinct information and can comprise multiple energized longitudinal modes. The modes of one of the optical signals can be substantially interleaved or interspersed with or among the modes of the other optical signals. The multiplexing approach can facilitate integrated optical implementations, including to support on-chip optical networks, ultra short range optical interconnects, and optical buses in multicore computing systems.

BACKGROUND

Optical communication typically involves light transmitting information between two places. Information may be encoded or imprinted on the light via varying or modulating the light. So modulated, the light carries or conveys the information as the light propagates or travels from a sender to one or more recipients. Often, the modulated light follows a path laid out between the sender and the recipient; for example, one or more waveguides may guide the light towards its destination.

In many situations, a sender and a recipient desire to communicate more information than a single optical signal readily supports. One option for carrying additional information is to modulate the optical signal at a higher rate. However, elevating the modulation rate typically involves deploying more sophisticated systems and thereby incurring substantially higher cost. Further, as modulation rate increases, propagation over the waveguide may introduce signal distortion that complicates retrieving or discerning information from the optical signal. Accordingly, economics, engineering, application parameters, and/or physics can limit the amount of information that a single optical signal practically conveys.

To address this situation, conventional dense wavelength division multiplexing ("DWDM") increases the information an optical waveguide carries via transmitting multiple optical signals over the waveguide. Typical of such conventional DWDM approaches, each optical signal is assigned exactly one narrow wavelength band, for example as set forth in the "ITU" specifications published by the International Telecommunication Union. A first DWDM signal may be assigned the optical spectrum of 1528.77-1529.16 nm, a second DWDM signal may be assigned the optical spectrum of 1529.55-1529.94 nm, a third DWDM signal may be assigned the optical spectrum of 1530.33-1530.72 nm, and so forth. Most conventional DWDM communication systems include sophisticated laser technology for keeping the optical signal in its assigned spectral band, and such technology can be expensive, cumbersome, or ill matched for certain applications. Further, conventional devices that multiplex or combine the DWDM optical signals for transmission or that demultiplex or segregate the DWDM optical signals for detection can be expensive, cumbersome, or ill matched for certain applications.

In view of the foregoing discussion of representative deficiencies in the art, need exists for improved technologies for transmitting more information over an optical path, link, or waveguide. Need is apparent for improved multiplexing systems and methods that may be implemented with reduced complexity, lower cost, increased manufacturability, relaxed tolerances, smaller size, better integration, less support equipment, more bandwidth, or other benefit, for example. A technology addressing any such need, or some other related shortcoming in the art, would promote high-speed optical communications and facilitate new applications.

SUMMARY

The present invention can support multiplexing optical signals. In one aspect of the present invention, two or more optical signals can each convey different or distinct information or data. Each optical signal can be imprinted or encoded with information, for example via digital or analog modulation. The optical signals can transmit, propagate, travel, or conduct on a common medium or along a common path. Multiplexing multiple optical carrier signals on a single light path can increase the light path's information carrying capability or bandwidth. The common medium can be, can comprise, or can be comprised by an optical waveguide, an optical fiber, a backplane, an optical network, an optical communication link, a free-space communication link, a series of lenses, a planar lightguide circuit ("PLC," also known as a "planar lightwave circuit"), a photonic integrated circuit ("PIC"), an on-chip optical communication network or line, a bus or link for a multicore computer processor, or an optical bus, for example. (These examples, like all other lists, sets, descriptions, passages, paragraphs, and sentences herein that provide examples and/or alternatives is not limiting, is not exhaustive, and is among others that the present invention may support.) Each optical signal can comprise multiple longitudinal modes that are substantially energized, forming a comb-like pattern when presented on a plot of intensity, power, or energy verses wavelength, color, or frequency. Each optical signal's photonic energy can be distributed or organized across a wavelength region in a pattern that may be viewed as substantially discrete and/or substantially discontinuous. The respective wavelength regions of the optical signals can overlap or substantially overlay one another. Alternatively or additionally, modes of one of the optical signals can be substantially interleaved, interspersed, or intermingled with modes of one or more other optical signals. The comb format of the optical signals can be compatible with integrated optical technologies that facilitate economical volume manufacturing, for example PLCs, PICs, silicon photonics, ring resonators, features photolithographically defined on a substrate, etc.

The discussion of optical multiplexing presented in this summary is for illustrative purposes only. Various aspects of the present invention may be more clearly understood and appreciated from a review of the following detailed description of the disclosed embodiments and by reference to the figures and claims. Other aspects, systems, processes, methods, features, advantages, benefits, and objects of the present invention will become apparent to one of ordinary skill in the art upon examination of the following detailed description and the accompanying figures. It is intended that all such aspects, systems, processes, methods, features, advantages, benefits, and objects are to be included within this description, are to be within the scope of the present invention, and are to be protected by the accompanying claims.

BRIEF DESCRIPTION OF THE FIGURES

FIGS. 1A, 1B, and 1C (collectively FIG. 1) are a functional block diagram of an optical communication system in accordance with certain exemplary embodiments of the present invention.

FIGS. 9A, 9B, 9C, and 9D (collectively FIG. 9) are illustrations of lasing systems in accordance with certain exemplary embodiments of the present invention.

Figure 1C:
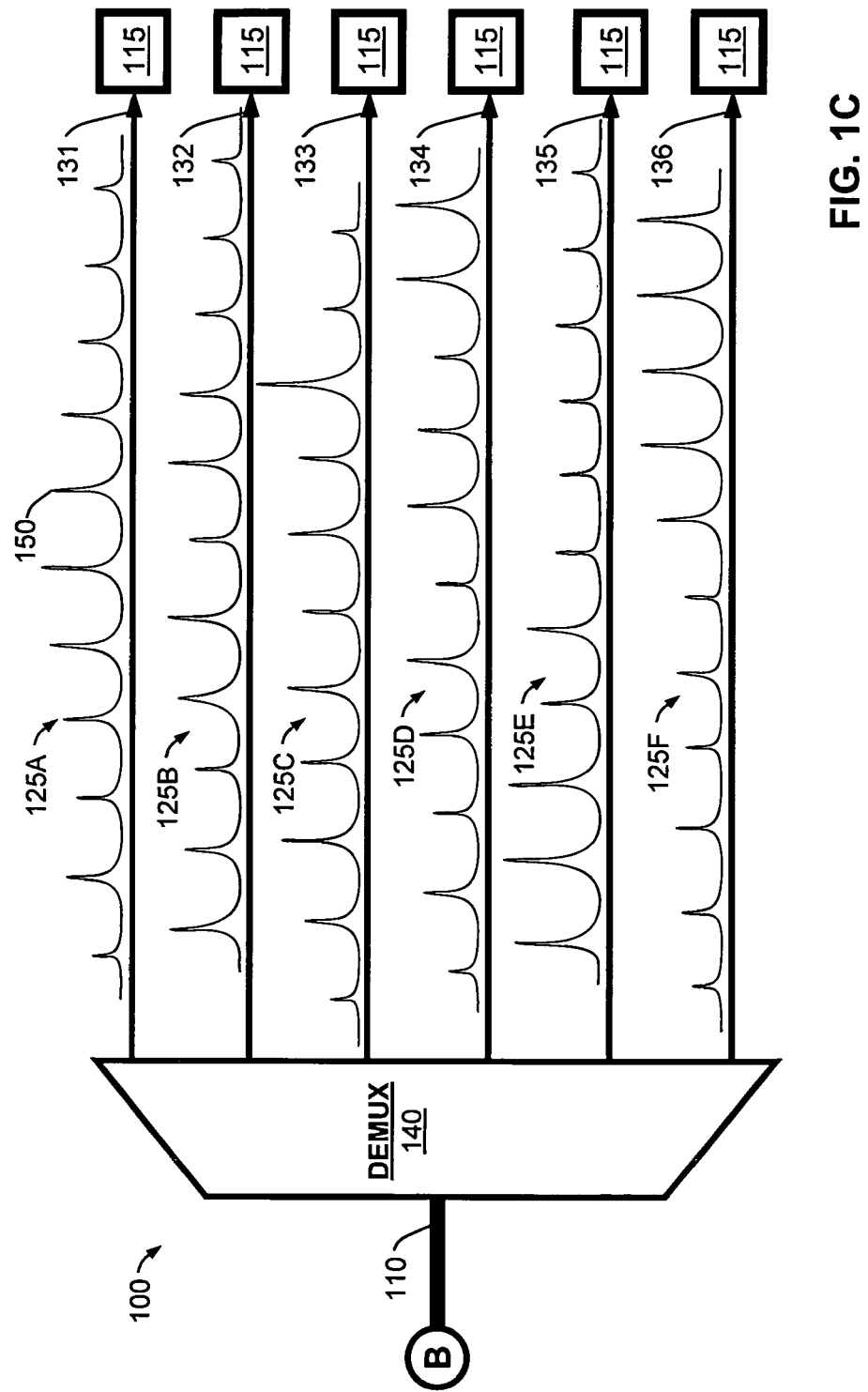

Many aspects of the present invention can be better understood with reference to the above figures. The elements and features shown in the figures are not necessarily to scale, emphasis instead being placed upon clearly illustrating principles of exemplary embodiments of the present invention. Moreover, certain dimensions may be exaggerated to help visually convey such principles. In the figures, reference numerals designate like or corresponding, but not necessarily identical, elements throughout the several views.

DETAILED DESCRIPTION OF EXEMPLARY EMBODIMENTS

Certain exemplary embodiments of the present invention support multiplexing optical signals that each comprises multiple longitudinal modes distributed across a common wavelength region. When plotted as intensity, power, or energy verses wavelength, color, or frequency, each optical signal can resemble a comb. In contrast to typical conventional DWDM optical signals, the comb-shaped optical signals can be processed with resonator systems that are relatively simple and that can be mass produced economically. This capability can facilitate applications such as on-chip optical communications and optical interconnects having tight economic constraints.

Figure 2:
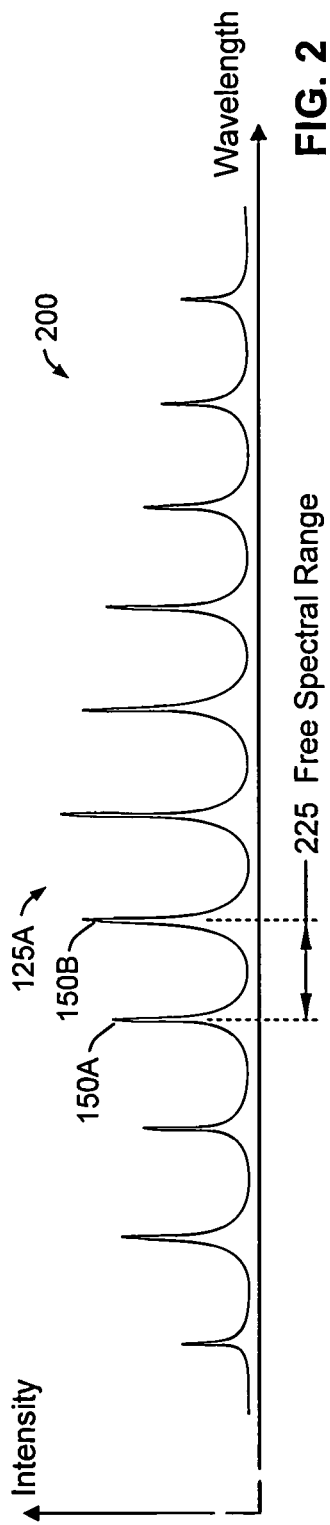
FIG. 2 is a plot of intensity of an optical communication signal verses wavelength in accordance with certain exemplary embodiments of the present invention.
Figure 3:
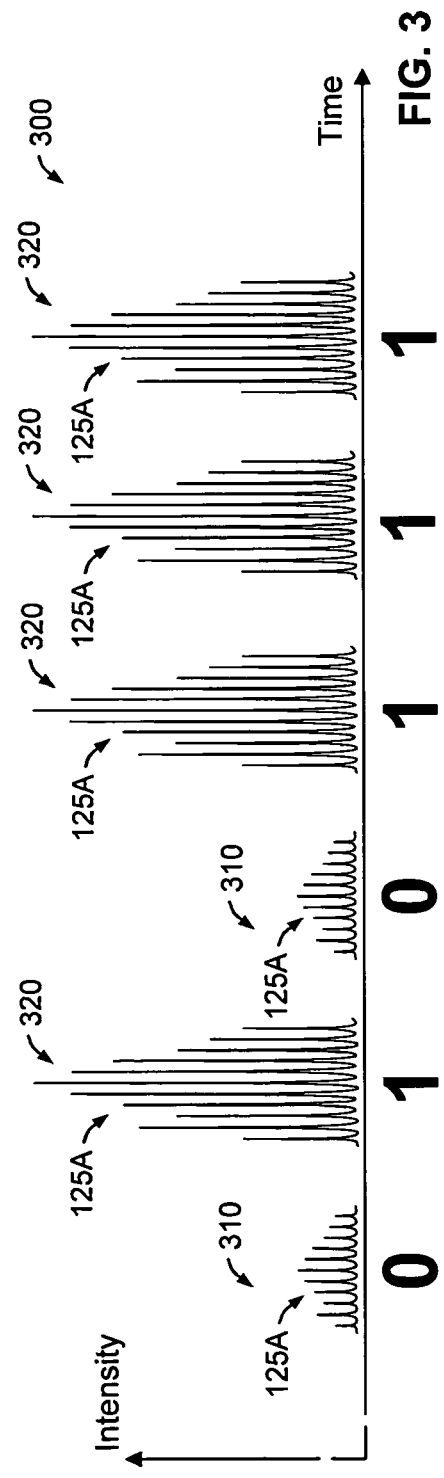
FIG. 3 is a plot of intensity of a modulated optical communication signal over time in accordance with certain exemplary embodiments of the present invention.

The present invention will be discussed more fully hereinafter with reference to FIGS. 1-11, which provide additional information regarding representative or illustrative embodiments of the present invention. FIGS. 1, 2, and 3 illustrate a multiplexed optical communication system and certain exemplary signal embodiments. FIGS. 4, 5, 6, 7, and 8 illustrate multiplexing and demultiplexing technology for certain exemplary embodiments. FIG. 9 illustrates laser technology for certain exemplary embodiments. FIG. 10 illustrates a flowchart relevant to methods or processes associated with operating certain embodiments. FIG. 11 illustrates a multicore processor system in the context of an exemplary application, usage, deployment, or operating environment for certain embodiments.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples," "embodiments," and "exemplary embodiments" given herein are intended to be non-limiting, and among others supported by representations of the present invention.

This document includes sentences, paragraphs, and passages (some of which might be viewed as lists) disclosing alternative components, elements, features, functionalities, usages, operations, steps, etc. for various embodiments of the present invention. Unless clearly stated otherwise, all such lists, sentences, paragraphs, passages, and other disclosures are not exhaustive, are not limiting, are provided in the context of describing representative examples and variations, and are among others supported by various embodiments of the present invention. Accordingly, those of ordinary skill in the art having benefit of this disclosure will appreciate that the present invention is not constrained by any such lists, examples, or alternatives. Moreover, the inclusion of lists, examples, embodiments, and the like will help guide those of ordinary skill in practicing many more implementations and instances of the present invention without undue experimentation, all of which are intended to be within the scope of the claims.

This disclosure includes figures and discussion in which features and elements of certain embodiments have been organized into functional blocks, subsystems, or modules. And, certain processes and methods have been organized into steps. Such organization is intended to enhance readership and to teach the reader about working principles of the present invention and about making and using an abundance of embodiments of the present invention. The organization is not intended to force any rigid divisions or partitions that would limit the present invention. In practice, the flexibility of the present invention supports dispersing or grouping functionalities, elements, and features in many different ways. The inclusion of an element or function in one block, module, or subsystem verses another can be substantially arbitrary in many instances, with the divisions being soft and readily redrawn using ordinary skill and this rich disclosure. Accordingly, functional blocks, modules, subsystems, and the like can be combined, divided, repartitioned, redrawn, moved, reorganized, or otherwise altered without deviating from the scope and spirit of the present invention. This is not to say that the disclosed organizations and combinations are not novel or are obvious.

Turning now to FIG. 1, this figure illustrates a functional block diagram of an exemplary optical communication system 100 according to certain embodiments of the present invention. The optical communication system 100 comprises multiple lasers 105 each outputting a respective optical signal 125A, 125B, 125C, 125D, 125E, 125F to an associated optical waveguide 121, 122, 123, 124, 125, 126. As will be discussed in further detail below, each optical signal 125A, 125B, 125C, 125D, 125E, 125F comprises multiple longitudinal modes of light ("modes") 150 organized in a distinct pattern and modulated so as to convey distinct information. The optical waveguides 121, 122, 123, 124, 125, 126 respectively feed the optical signals 125A, 125B, 125C, 125D, 125E, 125F to a multiplexer 135.

The multiplexer 135 combines the optical signals 125A, 125B, 125C, 125D, 125E, 125F and feeds the combined optical signals 125A, 125B, 125C, 125D, 125E, 125F onto the transmission optical waveguide 110. As shown in FIG. 1B, modes 150 of the optical signals 125A, 125B, 125C, 125D, 125E, 125F are interspersed or interleaved among one another for transmission over the transmission optical waveguide 110. The transmission optical waveguide 110 may be or comprise an optical fiber, an optical bus (for example for a multichip module or a multicore processor), or a waveguide disposed on or in a substantially planar substrate, for example.

The term "optical waveguide," as used herein, generally refers to a device or structure that directs, controls, or steers light to flow along a path, course, route, or channel and confines, limits, or binds the light so the light generally says on or in the path, course, route, or channel. An optical waveguide can comprise one or more structures that guide and/or generally confine light during transmission. For example, such an optical waveguide can comprise an elongate or elongated section of optical material that has high refractive index relative to an adjacent material, such as a cladding. In this configuration, the cladding helps keep the light on course. Another type of waveguide can comprise a material with a pattern of structures, such as holes, that help transmitting light maintain a prescribed course of travel without unwanted or excessive divergence or loss. The term "transmission optical waveguide," as used herein, generally refers to an optical waveguide for transmitting or communicating information or data, such as from a sender to or towards a recipient.

The transmission optical waveguide 110 feeds the combined optical signals 125A, 125B, 125C, 125D, 125E, 125F to a demultiplexer 140 that segregates the optical signals 125A, 125B, 125C, 125D, 125E, 125F. The optical signals 125A, 125B, 125C, 125D, 125E, 125F are respectively directed to the optical waveguides 131, 132, 133, 134, 135, and 136, each feeding a respective detector 115. The detectors 115 convert the optical signals 125A, 125B, 125C, 125D, 125E, 125F into corresponding electrical signals. The electrical signals carry the information that was encoded or imprinted on the optical signals 125A, 125B, 125C, 125D, 125E, 125F at the laser end of the optical communication system 100. Accordingly, the optical communication system 100 conveys information optically, and the information may be digital or analog.

Although FIG. 1 illustrates an exemplary embodiment in which all the optical signals 125A, 125B, 125C, 125D, 125E, 125F feed onto the transmission optical waveguide 110 at one site or node and feed off the transmission optical waveguide 110 at another site or node, other embodiments add and/or drop individual ones or groups of the optical signals 125A, 125B, 125C, 125D, 125E, 125F at certain sites or nodes. For example, the optical communication system 100 could comprise an intermediate site or node disposed between the multiplexer 135 and demultiplexer 140 for dropping the optical signal 125C and adding another optical signal that is encoded or imprinted with different information. In this manner, information or data can be dropped from and/or added to the optical waveguide 120. Furthermore, certain embodiments of the optical communication system 100 can comprise one or more ring networks, star networks, point-to-point links, mesh networks, or other network configurations, as appropriate.

Turning now to FIG. 2, this figure illustrates a plot 200 of intensity of an exemplary optical communication signal verses wavelength according to certain embodiments of the present invention. In an exemplary embodiment, the plotted optical communication signal describes the optical signal 125A shown in FIG. 1 as discussed above (as a representative one of the optical signals 125A, 125B, 125C, 125D, 125E, 125F), and thus will be referred to as such.

As plotted, the optical signal 125A resembles a comb, with each mode 150 resembling a comb tooth. Photonic energy from the laser 105 is concentrated at the mode locations. The modes 150A and 150B are separated from one another by a frequency known as a free spectral range 225. Thus, adjacent ones of the illustrated modes 150 are spaced in frequency according to the free spectral range 225.

The term "free spectral range," as used herein, generally refers to a frequency spacing between consecutive peaks, modes, maxima, or minima of a spectrum containing a periodic series of such features resulting from a resonance, Fabry-Perot effect, etalon, ring, cavity, or similar phenomenon or structure. The usage herein of the term "free spectral range" is intended to conform to the term's common industry meaning.

The free spectral range 225 of each optical signal 125A, 125B, 125C, 125D, 125E, 125F can be distinct. Additionally (or in some cases alternatively) the optical signals 125A, 125B, 125C, 125D, 125E, 125F can have distinct mode patterns or spectral combs, for example shifted in wavelength and/or frequency relative to one another. Thus, the photonic energy in each optical signal 125A, 125B, 125C, 125D, 125E, 125F can be organized across a range of wavelengths in a distinct pattern that is substantially discrete and substantially discontinuous. FIG. 1 illustrates such distinctions in representative form, as can best be seen in FIG. 1B.

The free spectral range 225 can be inversely proportional to the distance between reflective surfaces in an interferometer, an etalon, Fabry-Perot structure, or a resonant cavity, for example. As will be discussed in further detail below, each laser 105 can comprise a cavity or a pair of reflective surfaces correlating to the free spectral range 225 and producing the series of modes 150 illustrated in FIG. 2. Each the cavities of the lasers 105 can be sufficiently different from one another to create the spectral differences, mode shifting, and/or different free spectral ranges 225. As will be discussed in further detail below, such differences facilitate differentiating the optical signals 125A, 125B, 125C, 125D, 125E, 125F from one another in connection with aggregating, combining, separating, adding, dropping, multiplexing, demultiplexing, or otherwise processing the optical signals 125A, 125B, 125C, 125D, 125E, 125F. Furthermore, each channel in a multiplexing scheme can have an associated span of free spectral ranges 225.

In certain exemplary embodiments, each of the lasers 105 was fabricated to a common specification, and the difference in spectral output among the lasers 105 results from operating each of the lasers 105 under different conditions. In certain exemplary embodiments, differences among the lasers are purposely introduced during fabrication to produce spectral differences. In certain exemplary embodiments, the lasers 105 are made using different specifications. In certain exemplary embodiments, the lasers 105 are fabricated to a common specification, but manufacturing variability/manufacturing tolerance introduces variations that produce spectral differences. For example, a batch of lasers can be made and sorted according to spectral output or cavity length for multiplexed deployment as illustrated in FIG. 1. Accordingly, the lasers 105 can be fabricated to a common specification and operated to create cavity distinctions, fabricated to a common specification and sorted according to cavity distinctions arising from manufacturing tolerances, or fabricated to different specifications.

Turning now to FIG. 3, this figure illustrates a plot 300 of intensity of an exemplary modulated optical communication signal over time according to certain embodiments of the present invention. In an exemplary embodiment, the plotted optical communication signal describes the optical signal 125A shown in FIGS. 1 and 2 as discussed above (as a representative one of the optical signals 125A, 125B, 125C, 125D, 125E, 125F), and thus will be referred to as such.

FIG. 3 illustrates imprinting or encoding an exemplary data sequence onto the optical signal 125A via exemplary modulation. Over time, the intensity of the optical signal 125A varies from a discrete low intensity 310 representing a zero to a discrete high intensity 320 representing a one. The resulting sequence of one and zeros transmits over the optical waveguide 121, the transmission optical waveguide 110, and the optical waveguide 131 for receipt by the associated detector 115. Data can flow in this manner across the optical communication system 100.

Each laser 105 supports a unique data sequence encoded on its associated optical signal 125A, 125B, 125C, 125D, 125E, 125F, which can be distinguished according to its distinctive spectral pattern of modes. The optical communication system 100 thereby provides multiple communication channels for expanding the information carrying capacity or bandwidth of the transmission optical waveguide 110.

While the plot 300 illustrates a discrete amplitude form of modulation, other types are supported. For example, analog modulation can be applied to the amplitude or intensity of the optical signal 125A. Further, analog or digital information or data can be imprinted or encoded on the optical signal 125A via analog modulation, discrete modulation, binary modulation, multilevel modulation, tertiary modulation, spread spectrum modulation, frequency modulation, phase shifted modulation, return to zero ("RZ") modulation, non-return to zero ("NRZ") modulation, etc. More generally, each of the optical signals 125A, 125B, 125C, 125D, 125E, 125F can be varied, changed, or altered in some manner that facilitates communicating information, whether one indicator or flag, a single bit, or volumes and volumes of information.

In accordance with certain exemplary embodiments, energy can transfer freely or substantially among the modes 150. That is, the modes 150 of one of the optical signals 125A, 125B, 125C, 125D, 125E, 125F can have different intensities over time. For one discrete high intensity 320 representing a digital one, the mode 150A may have lower intensity than the mode 150B (as illustrated in FIG. 2), while in a subsequent high intensity 320 representing another one, the mode 150A may have higher intensity than the mode 150B.

Figure 4:
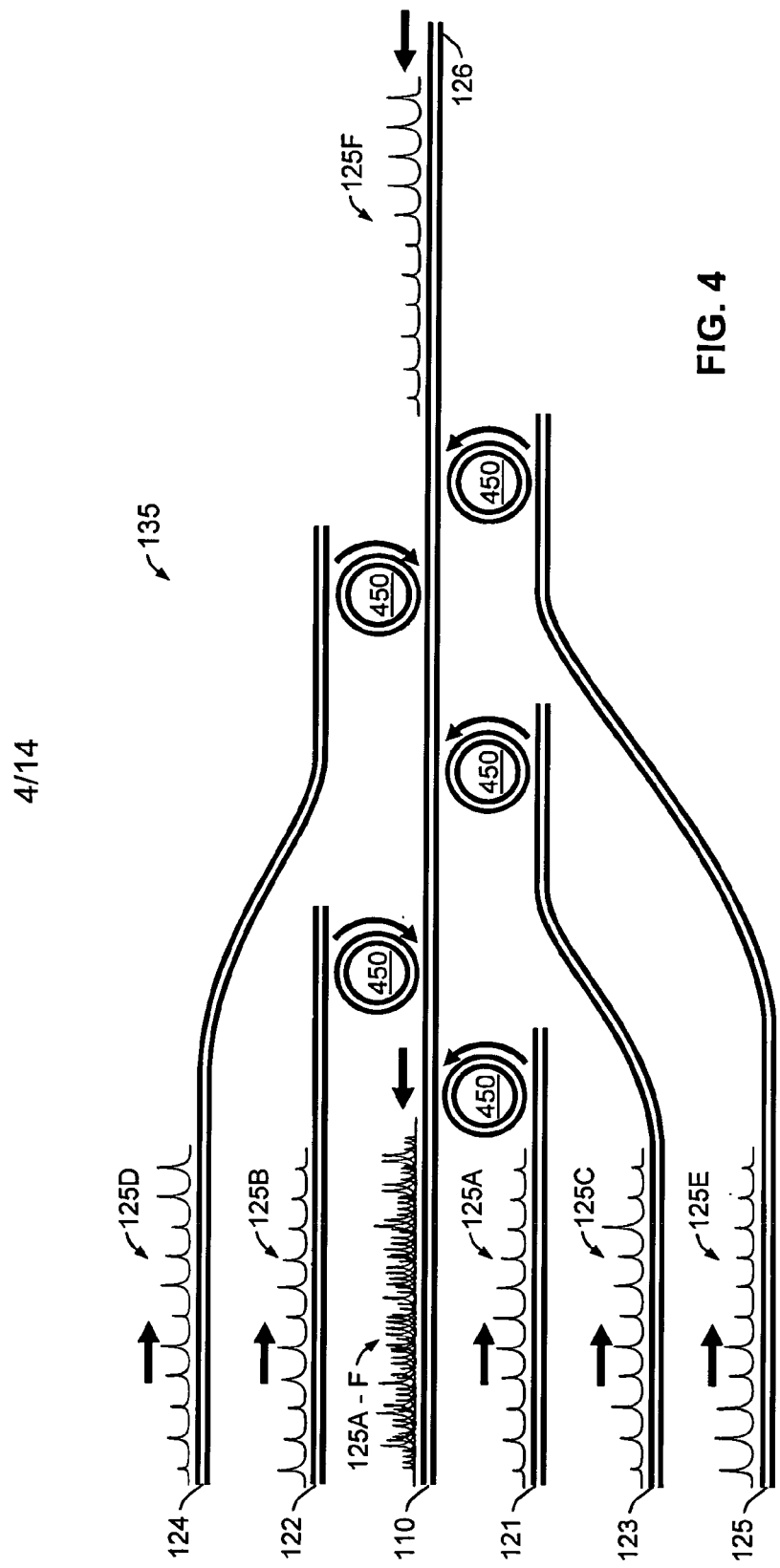
FIG. 4 is a functional block diagram of a multiplexer comprising ring resonators in accordance with certain exemplary embodiments of the present invention.

Turning now to FIG. 4, this figure illustrates a functional block diagram of an exemplary multiplexer 135 comprising ring resonators 450 according to certain embodiments of the present invention. In an exemplary embodiment, the multiplexer 135 that FIG. 4 illustrates is representative of the multiplexer 135 shown in FIG. 1A and discussed above, and thus will be referred to as such.

The optical signals 125A, 125B, 125C, 125D, 125E, 125F respectively enter the multiplexer 135 on the optical waveguides 121, 122, 123, 124, 125, 126. Each of the optical waveguides 121, 122, 123, 124, 125, 126 has at least one associated ring resonator 450 for multiplexing. The optical waveguides 121, 122, 123, 124, 125 each couples to the transmission optical waveguide 110 via a respective ring resonator 450, for light insertion or coupling. In the illustrated exemplary embodiment, the optical waveguide 126 leads into the transmission optical waveguide 110 which is fed by the ring resonators 450. However, in certain exemplary embodiments, a ring resonator (not illustrated) couples the optical waveguide 126 to the transmission optical waveguide 110.

As will be discussed in further detail below with reference to FIG. 6, the multiplexer 135 can be configured in a chip or planar format, for example as a PLC or a PIC. Furthermore, in certain exemplary embodiments, a PLC, a PIC, a chip, or a highly integrated multicore computing system can comprise the entire optical communication system 100, with that system 100 disposed on or in a single substrate.

Figure 5:
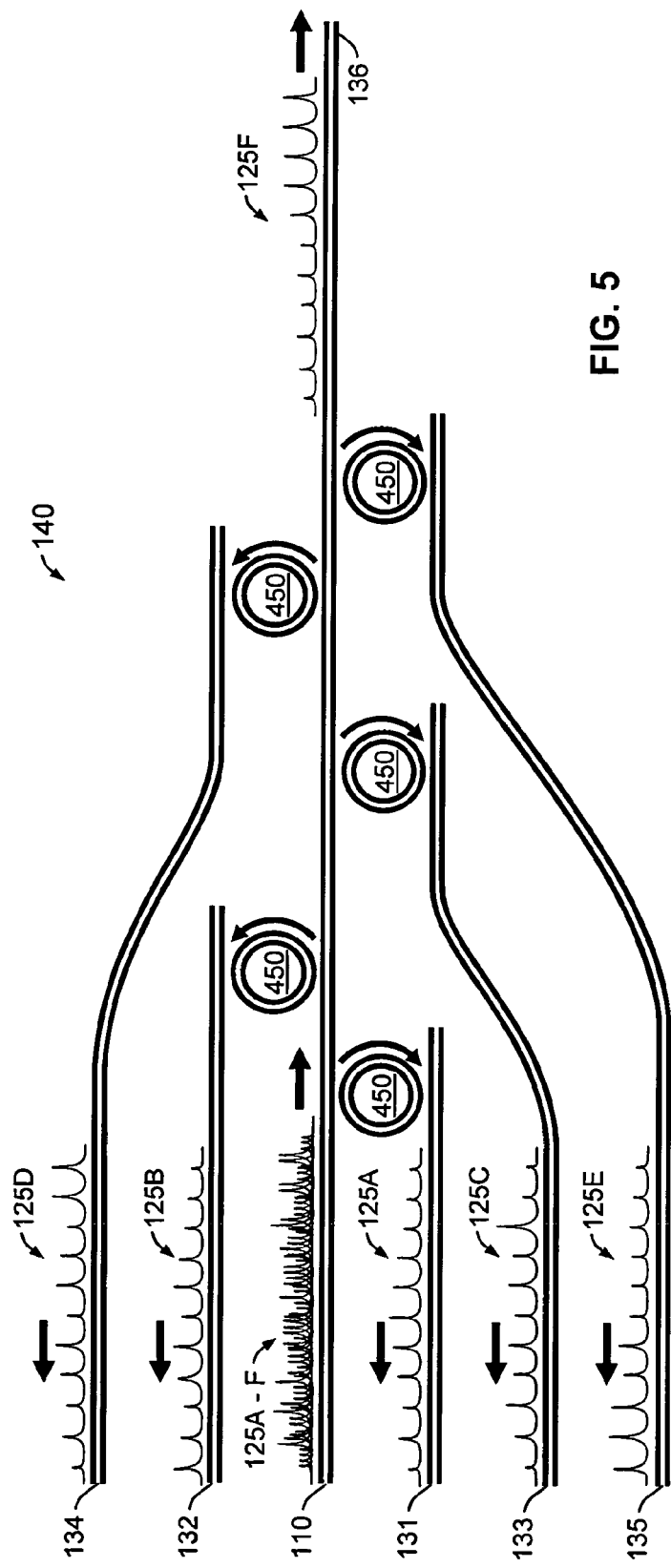
FIG. 5 is a functional block diagram of a demultiplexer comprising ring resonators in accordance with certain exemplary embodiments of the present invention.

Turning now to FIG. 5, this figure illustrates a functional block diagram of an exemplary demultiplexer 140 comprising ring resonators 450 according to certain embodiments of the present invention. In an exemplary embodiment, the demultiplexer 140 that FIG. 5 illustrates is representative of the demultiplexer 140 shown in FIG. 1A and discussed above, and thus will be referred to as such.

The optical signals 125A, 125B, 125C, 125D, 125E, 125F respectively exit the demultiplexer 140 via the optical waveguides 131, 132, 133, 134, 135, 136. Each of the optical waveguides 131, 132, 133, 134, 135, 136 has at least one associated ring resonator 450 for demultiplexing. The optical waveguides 131, 132, 133, 134, 135 each couples to the transmission optical waveguide 110 via a respective ring resonator 450, for light extraction or coupling. In the illustrated exemplary embodiment, the transmission optical waveguide 110 leads into the optical waveguide 136. However, in certain exemplary embodiments, a ring resonator (not illustrated) couples the optical waveguide 136 to the transmission optical waveguide 110.

In certain exemplary embodiments, the demultiplexer 140 can be configured in a chip or planar format, for example as a PLC or a PIC. As discussed above, the demultiplexer 140 and the multiplexer 135 can be disposed on or in a common PLC or PIC or on a common substrate that may or may not be part of a PLC or a PIC.

Figure 6A:
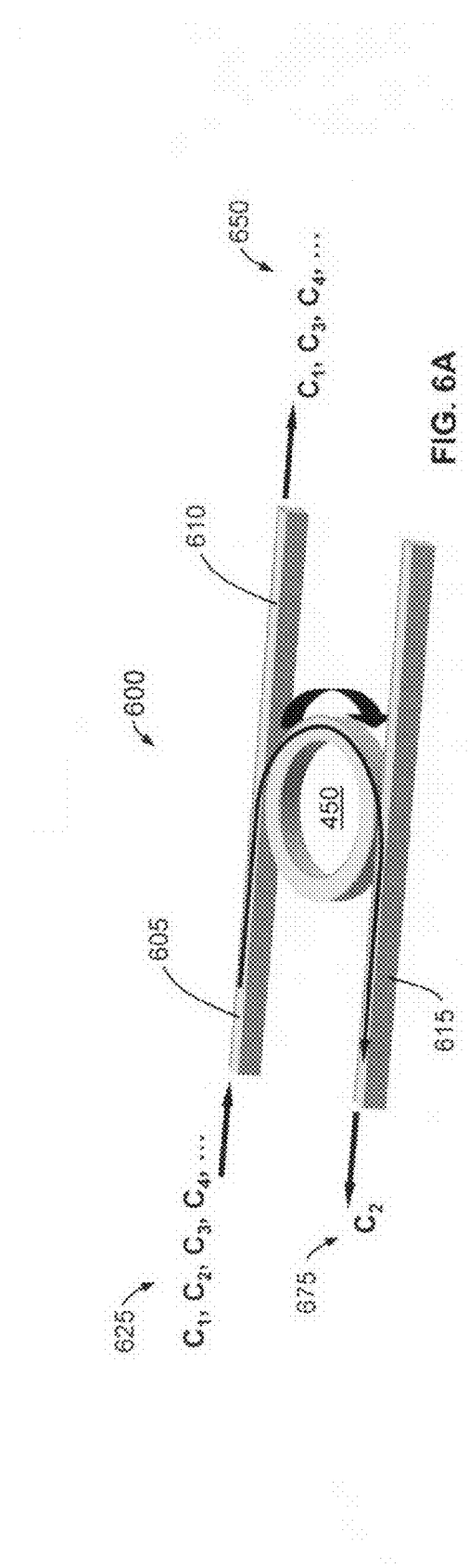
FIGS. 6A, 6B, and 6C (collectively FIG. 6) are ring resonator illustrations in accordance with certain exemplary embodiments of the present invention.
Figure 6B:
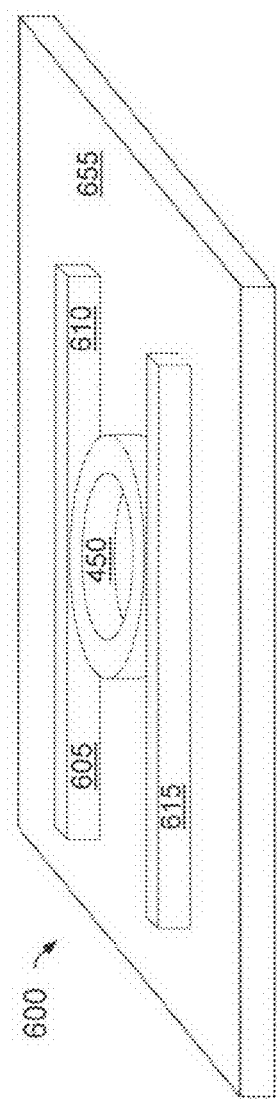
Figure 6C:
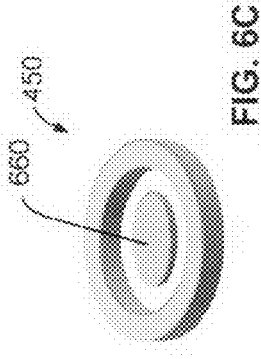

Turning now to FIG. 6, this figure illustrates exemplary ring resonators 450 according to certain embodiments of the present invention. Each ring resonator 450 and its associated optical waveguide segments 605, 610, 615 form a ring resonator filtering system 600. In an exemplary embodiment, the ring resonators 450 illustrated in FIGS. 6A, 6B, and 6C can be representative of the ring resonators 450 of the multiplexer 135 and the demultiplexer 140, respectively illustrated in FIGS. 4 and 5, and thus will be referred to as such.

Referring to FIG. 6A, multiple channels ($C_1$, $C_2$, $C_3$, $C_4$ ...) 625 propagate towards the ring resonator 450 on the optical waveguide segment 605. Channels $C_1$, $C_2$, $C_3$, $C_4$ ... 625 can respectively carry or comprise the optical signals 125A, 125B, 125C, 125D, ..., for example. The channel $C_1$ 675 (optical signal 125A) couples onto the ring resonator 450, travels clockwise around the ring resonator 450, and couples onto the optical waveguide segment 615. The remaining channels $C_2$, $C_3$, $C_4$ ... 650 (optical signals 125B, 125C, 125D, ...) continue past the ring resonator 450 and onto the optical waveguide 610. Beyond operating as a component of the demultiplexer 140 as described, the ring resonator filtering system 600 can function as a drop filter.

Operating in reverse direction with respect to that illustrated in FIG. 6A, the ring resonator filtering system 600 adds signals, either as an element of the multiplexer 135 or as an add filter. In other words, the ring resonator filtering system 600 functions either in an add or multiplexing mode with the light-direction arrows as depicted or in a drop or demultiplexing mode with the light-direction arrows reversed.

FIG. 6B illustrates an exemplary embodiment of the ring resonator filtering system 600 wherein the ring resonator 450 and the optical waveguide segments 605, 610, 615 are disposed on or in a substrate 655. In certain exemplary embodiments, the substrate 655 can comprise silicon, a semiconductor material, or a III-V material. Further, the substrate 655 can comprise silicon dioxide, ceramic, or other appropriate material or compositions of materials. Typically, all the ring resonators 450 and light paths of the multiplexer 135 or of the demultiplexer 140 are disposed on or in a common substrate, such as the substrate 655. In certain exemplary embodiments, the multiplexer 135 and the demultiplexer 140 are disposed on or in the substrate 655.

The illustrated planar format can be fabricated utilizing photolithographic techniques implemented in wafer-scale processes. Accordingly, the illustrated embodiment facilitates economical volume manufacturing and may be implemented using facilities and/or technology originally developed to support manufacturing silicon-based computer chips.

FIG. 6C illustrates an exemplary embodiment of a ring resonator 450 that comprises an actuator 660 for adjusting, controlling, or manipulating optical characteristics such as filter response. For example, the actuator 660 can adjust circumference of the ring resonator 450 and thereby the free spectral range 225. In certain exemplary embodiments, the actuator 660 comprises a heating or cooling element. Varying the temperature of the ring resonator 450 can produce localized thermal expansion or contraction resulting in changing the circumference. Such a circumference change can comprise a dimensional or physical change in circumference or a change in refractive index producing a change in effective or optical circumference. Accordingly, the wavelengths or frequencies of light that can circulate around the ring resonator 450 in resonant fashion can be manipulated.

As an alternative to temperature-based tuning or adjustment, the filter response of the ring resonator 450 can be manipulated via magnetic field, electrical field, charge density, light, electromagnetic field, etc. in accordance with an implementation known in the art. For example, the actuator 660 can comprise an electrode. Thus, various embodiments of tunable ring resonators 450 can be made, implemented, used, and practiced by one of ordinary skill in the art having benefit of this disclosure without undue experimentation.

While the ring resonator 450 illustrated in FIG. 6 is generally circular, other geometric forms can be utilized. For example, the ring resonators 450 of the multiplexer 135 and the demultiplexer 140 can be oval shaped, looped, oblong, figure-eight shaped, race-track shaped, or some other appropriate closed loop form.

In certain exemplary embodiments, the ring resonator filtering system 600 comprises a ring resonator as disclosed in U.S. Pat. No. 6,393,186, entitled "Channel-Switched Cross-Connect" and issued May 21, 2002 to David A. G. Deacon (the '186 patent). One of ordinary skill in the art having benefit of this disclosure can utilize the teaching of the '186 patent to provide the ring resonator filtering system 600 with athermal characteristics or temperature independence. Further, one of ordinary skill in the art having benefit of this disclosure can utilize the teaching of the '186 patent to provide the ring resonator filtering system 600 with tunability, via changing a temperature of a thermo-optic material or by applying electric files to electro-optic materials or liquid crystals or by applying stress or acoustic or another field to appropriately sensitive materials. Accordingly, the ring resonator filtering system 600 can be adjusted or tuned.

In certain exemplary embodiments, the ring resonator filtering system 600 comprises a ring resonator as disclosed in U.S. Pat. No. 6,052,495, entitled "Resonator Modulators and Wavelength Routing Switches" and issued Apr. 18, 2000 to Brent E. Little, et al.

Figure 7:
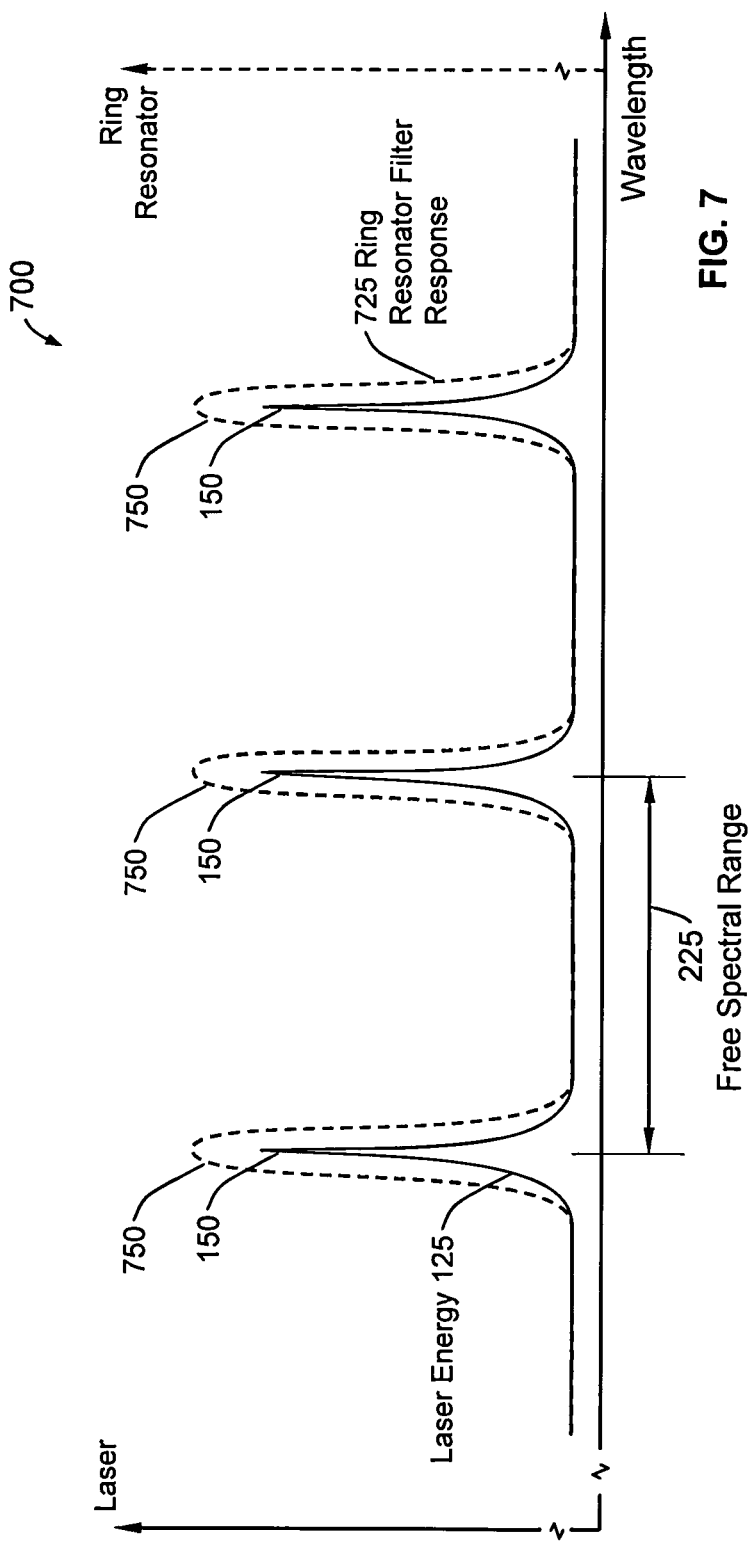
FIG. 7 is a graph depicting a plot of a ring resonator filter response overlaid with a plot of an optical communication signal, both on a common wavelength axis, in accordance with certain exemplary embodiments of the present invention.

Turning now to FIG. 7, this figure illustrates a graph 700 depicting a plot 750 of an exemplary ring resonator filter response overlaid with a plot 125 of an exemplary optical communication signal, both on a common wavelength axis, according to certain embodiments of the present invention. In an exemplary embodiment, the plot 750 illustrates a filter response of the ring resonator 450 illustrated in FIG. 6 and discussed above, and thus will be described in that context. In an exemplary embodiment, the plot 125 illustrates spectral characteristics of one of the optical signals 125A, 125B, 125C, 125D, 125E, 125F discussed above, such as the optical signal 125A that FIG. 2 describes, and thus will be described in that context.

Each peak 750 of the plot 725 of the ring resonator filter response can stem from a wavelength or frequency for which the ring resonator 450 supports resonance or resonant circulation. Adjusting a physical dimension of the ring resonator 450 varies the wavelengths or frequencies of resonance and thus the spectral positions of the peaks 750. Adjusting refractive index of the ring resonator 450, for example refractive index of the closed waveguide that forms the ring resonator 450 or an associated cladding, can likewise varying the resonant frequencies or wavelengths and thus the spectral positions of the peaks 750. Varying the ring resonator's optical characteristics can further change the free spectral range 225 of the ring resonator's filter response. As discussed above, the ring resonator 450 can be tuned with temperature, light, electricity, charge, hole concentrations, magnetic field, electrical field, etc.

With the peaks 750 of the ring resonator 450 aligned with the modes 150 of the optical signal 125 as illustrated, the ring resonator filtering system 600 manages, diverts, or manipulates the optical signal 125 for multiplexing, demultiplexing, adding, or dropping, as discussed above. At frequencies or wavelengths of resonance, the ring resonator 450 can couple light from one waveguide to another as discussed above with reference to FIGS. 4, 5, and 6, while rejecting such coupling at other frequencies or wavelengths.

In certain exemplary embodiments, the peaks 750 of the ring resonator 450 can be wider, blunter, less sharp, or flatter than the modes 150 of the optical signal 125. For example, the ring resonator 450 can have a finesse that provides some tolerance for aligning the peaks 750 with the modes 150.

The finesse (F) can be characterized as:

$$F = FSR/\Delta\lambda_{FWHM} \qquad (i)$$

wherein FSR is free spectral range 225 and $\Delta\lambda_{FWHM}$ is the bandwidth of a resonance (e.g. peak 750) at full width at half maximum. Free spectral range can be characterized as:

$$FSR = \lambda_i^2/\eta_{eff}L \approx \lambda_i^2/\eta_{eff}(2\pi R + 2L_c) \qquad (ii)$$

where R is ring radius, $L_c$ is coupler length, $\eta_{eff}$ is the effective waveguide index, and $\lambda_i$ is a resonant wavelength (e.g. peak 750).

Finesse can be further characterized by the equation:

$$F = \pi/2 \sin^{-1}\{(1-\rho)/2\rho^{1/2}\} \quad \text{(iii)}$$

with:

$$\rho = e^{-\alpha}(1-\kappa) \quad \text{(iv)}$$

wherein α is total attenuation coefficient per trip around a ring resonator and κ is a ring resonator's normalized coupling coefficient. (The four equations immediately above denoted "(i)," "(ii)," "(iii)," and "(iv)" are known in the art in connection with conventional resonator technologies.)

Considering these equations with respect to the ring resonator 450, finesse of the ring resonator 450 can be varied via changing internal loss or coupling loss. Increasing loss lowers finesse. Accordingly, introducing loss into (or onto) the ring resonator 450 via weakening the guiding of the ring waveguide or introducing an absorber to the waveguide or a cladding thereof can broaden the peaks 750.

In certain exemplary embodiments, the modes 150 of the optical signal 125 can be truncated to avoid a vernier effect or to increase the number of optical channels 625, 650 that the ring resonator filtering system 600 can accommodate. If the optical communication system 100 is desired to handle a large count of optical channels 625, certain modes 150 of one optical signal 125 in one channel 625 can substantially coincide with other modes 150 of another optical signal 125 in another channel 625 such that the filter response of the ring resonator filtering system 600 may inadvertently couple energy from both optical signals 125. This situation may be avoided by truncating the series or pattern of modes 150 of the optical signals 150. Alternatively, the ring resonator filtering system 600 can comprise multiple ring resonators 450 with different circumferences or refractive indices, for example. Accordingly, multiple approaches are available to avoid channel-to-channel crosstalk stemming from a recurring pattern of mode coincidence between channel peaks 750.

Figure 8:
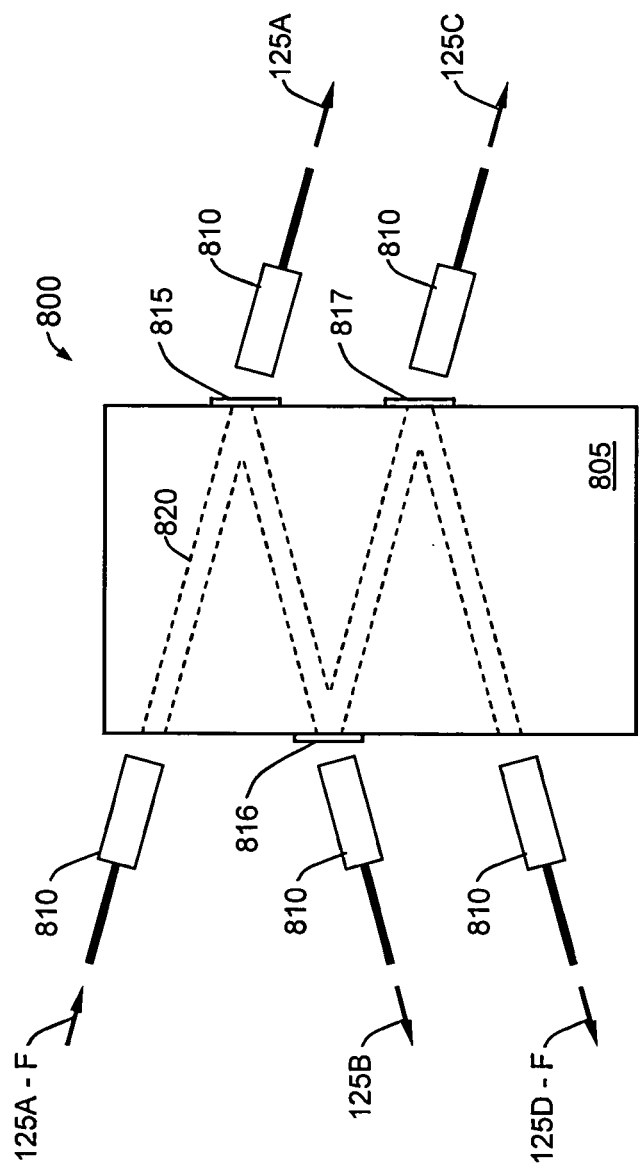
FIG. 8 is an illustration of an optical add-drop multiplexing device in accordance with certain exemplary embodiments of the present invention.

Turning now to FIG. 8, this figure illustrates an exemplary optical add-drop multiplexing device 800 according to certain embodiments of the present invention. In certain exemplary embodiments, the device 800 can be an embodiment of the multiplexer 135 illustrated in FIG. 1A and discussed above. In certain exemplary embodiments, the device 800 can be an embodiment of the demultiplexer 140 illustrated in FIG. 1B and discussed above. In certain exemplary embodiments, the device 800 can be coupled to the transmission optical waveguide 110, for example midway between the multiplexer 135 and the demultiplexer 140, and function as an optical add-drop multiplexer.

In the illustrated exemplary embodiment, the optical signals 125A, 125B, 125C, 125D, 125E, 125F feed into the optical add-drop multiplexing device 800. A coupling device 810 couples the optical signals 125A, 125B, 125C, 125D, 125E, 125F to a light path 820 integrated with a member 805.

With the light path 820 comprising a waveguide disposed on the member 805, for example as a substrate, the coupling device 810 can be a mechanical holder for an optical fiber or have an optical function, for example expanding, compressing, converging, or otherwise manipulating or managing light to facilitate light coupling or transfer to the light path 820.

In certain exemplary embodiments, the optical path 820 comprises holes or channels in the member 805. Such holes can be drilled into the member 805 from opposite sides or formed using an EDM machining process. Alternatively, the light path 820 can comprise channels formed with a milling machine or similar process. In terms of composition, the member 805 can comprise optically transparent material, opaque material, metal, dielectric material, ceramic, etc.

With the optical path 820 comprising holes or channels in the member 805, each of the coupling devices 810 typically comprises a collimating optic, for example a gradient index ("grin") lens, a convex-convex lens, or a system of optical elements.

The optical signals 125A, 125B, 125C, 125D, 125E, 125F transmit over the optical path 820 to a filtering device 815. The filtering device 815 transmits the optical signal 125A and reflects or diverts the optical signals 125B, 125C, 125D, 125E, 125F for continued transmission on the optical path 820. Upon the optical signals 125B, 125C, 125D, 125E, 125F encountering the filtering device 816, the optical signal 125B is dropped while the optical signals 125C, 125D, 125E, 125F are reflected for transmission to the filtering device 817. The filtering device 817 transmits the optical signal 125C and reflects the optical signals 125D, 125E, 125F, which exit the member 805 for continued propagation, such as on the transmission optical waveguide 110. Thus, light zigzags across the member 805, selected signals are dropped, and other signals continue.

In an exemplary embodiment, each of the filtering devices 815, 816, 817 can comprise an etalon, a film, or an appropriate structure that provides a respective comb-shaped filtering response as illustrated in FIG. 7 and discussed above. The filtering device 815 can provide a filtering response that is tuned or configured to match the optical signal 125A so that signal modes 150 substantially coincide with filter response peaks 750. In an etalon embodiment, the thickness of the etalon can define the free spectral range 225 and positions of the peaks 750. The filtering response of the filtering device 816 can substantially coincide or overlay with the spectral pattern of the optical signal 125B. In an etalon embodiment, etalon thickness or optical path length through the etalon, can define free spectral range 225 and positions of the peaks 750. And, the filtering response of the filtering device 817 can be aligned to the modes 150 of the optical signal 125C via an etalon having appropriate thickness. Each filtering device 815, 816, 817 can comprise a respective etalon with a distinct thickness or path length. Such a thickness can be defined during manufacturing based on dimensional differences or compositional differences providing different refractive indices. Alternatively, each filtering device 815, 816, 817 can comprise a respective etalon fabricated to a common specification but tuned thermally, optically, magnetically, electrically, etc.

The spectral responses of the filtering devices 815, 816, 817 can have peaks 750 that are flattened, wide, blunt, or less sharp relative to the modes 150 of the optical signals 125A, 125B, 125C, 125D, 125E, 125F. In an etalon embodiment, the filtering devices 815, 816, 817 can be imparted with such properties via varying the finesse. As will be appreciated by one of ordinary skill in the art having benefit of this disclosure, finesse of an etalon can be a function of reflectivity of an etalon's reflective surfaces, with higher reflectivity yielding higher finesse and sharper resonance (e.g. peaks 750).

Turning now to FIG. 9, this figure illustrates exemplary lasing systems according to certain embodiments of the present invention. Referring to FIG. 9A, this figure illustrates a perspective view of an exemplary edge emitting laser die 925 comprising facets that are each coated with a respective system of optical thin films according to certain embodiments of the present invention. The illustrated laser 105A can be an exemplary embodiment of the laser 105 illustrated in FIG. 1 and described above and thus will be discussed in that context.

In the laser 105A, the rear facet coating 950 can provide broadband reflectivity, for example reflecting about 90 to 98 percent of incident light and transmitting the remaining 2 to 10 percent of incident light. Typically, a power monitoring detector (not illustrated) disposed adjacent the rear facet coating 950 receives some of the transmitted light for monitoring. In certain exemplary embodiments, the rear facet coating 950 comprises multiple high index refractive layers interleaved between multiple low index of refractive layers, forming a stack of layers. The rear facet coating 950 can comprise alternating refractive index thin film layers that provide reflection and transmission via thin-film interference.

In certain exemplary embodiments, the front facet coating 975 provides wavelength selective reflectivity and transmission, for example reflecting about 70 to 85 percent of incident light in a defined spectral region while providing high transmission outside that defined spectral region. The spectral regions of high transmission can provide about 96 to 99.9 percent transmission substantially across the spectral gain region of the laser die 925, for example. In certain exemplary embodiments, the front facet coating 975 can be characterized as a notch reflector, in that it provides reflectivity in a spectral notch and substantial transmission outside the spectral notch. In certain exemplary embodiments, the front facet coating 975 comprises multiple high index of refractive layers interleaved between multiple low index of refractive layers. The front facet coating 975 can comprise alternating refractive index thin film layers that provide reflection and transmission via thin-film interference.

The laser 105A can produce light exhibiting a comb pattern of spectral energy distribution as illustrated in FIG. 2 (and other figures) and discussed above. With the front facet coating 975 providing a band of reflectivity situated within a region of high transmission, the comb teeth can be restricted to the band of reflectivity. Thus, the series or sequence of modes 150 of the optical signal 125 can be truncated. As discussed above, limiting the number of modes 150 in the optical signal 125 can help reduce channel-to-channel crosstalk or avoid a situation in which two modes 150 of two different optical signals (e.g. the optical signal 125A and the optical signal 125B) may substantially coincide spectrally or overlap in connection with a Vernier effect.

In certain exemplary embodiments, the series of modes 150 is truncated to facilitate increasing bandwidth. Two or more of the optical signals 125A, 125B, 125C, 125D, 125E, 125F can be confined to first spectral window, while two or more others are confined to second spectra window, and two more other are confined to a third window. For example, a first wavelength division multiplexing ("WDM") channel can carry a first set of optical signals 125A, 125B, 125C, 125D, 125E, 125F; while a second WDM channel carries a second set of optical signals 125A, 125B, 125C, 125D, 125E, 125F; a third WDM channel carries a third set of optical signals 125A, 125B, 125C, 125D, 125E, 125F; and so forth. Such WDM channels can be coarse wavelength division multiplexing ("CWDM") channels or DWDM channels. Accordingly, one WDM, CWDM, or DWDM channel can carry multiple optical signals that are multiplexed as illustrated in FIG. 1 (and elsewhere) and described herein in detail. Overlaying the present multiplexing technology on a WDM, CWDM, or DWDM system can support additional channels and heighten bandwidth and data carrying capacity.

The term "wavelength division multiplexing" or "WDM," as used herein, generally refers to transmitting, propagating, or conducting multiple optical signals, each conveying different or distinct information, on a common medium or along a common path, wherein each optical signal has a different wavelength or color or is assigned to a different region of the light spectrum. WDM often involves multiplexing multiple optical carrier signals on a single optical waveguide or fiber with different wavelengths or colors of light carrying different signals. The herein usage of the term "wavelength division multiplexing" or "WDM" is believed to be substantially consistent with typical industry terminology.

The term "course wavelength division multiplexing" or "CWDM," as used herein, generally refers to a type of WDM wherein one optical medium or path carries about four or more WDM signals that are spaced at least about 10 nm from one another. For example, a first CWDM channel could be assigned the spectral range 1310-1320 nm, a second CWDM channel could be assigned the spectral range 1320-1330 nm, a third CWDM channel could be assigned the spectral range 1330-1340 nm, and so forth.

The term "dense wavelength division multiplexing" or "DWDM," as used herein, generally refers to a type of WDM wherein WDM wavelengths are positioned on a grid having a spacing of about 200 Giga-Hertz (GHz) or less (about 1.6 nm). Thus, each DWDM signal can be assigned to a wavelength channel having a width of about 200 GHz (about 1.6 nm) or less. Many DWDM schemes (though not necessarily all) conform to the ITU specifications.

In certain exemplary embodiments, the front facet coating 975 and the rear facet coating 950 can have a broadband reflectivity, reflecting without substantial spectral selectivity. In such embodiments, the gain profiles of different lasers 105 can help avoid channel-to-channel interference associated with a Vernier effect. In certain exemplary embodiments and applications, such interference can avoid posing any issues, even without suppressing a gain profile or deploying spectrally selective reflectivity.

Spectral characteristics of the optical signal 125 produced by the laser 105A relate to the physical length of the laser 105A and the refractive index of the laser 105A. The front facet coating 975 and the rear facet coating 950 provide a lasing cavity. The spectral positions of the modes of the optical signal 125 and the free spectral range 225 relate to optical length of the lasing cavity. Each of the lasers 105 illustrated in FIG. 1 and discussed above can comprise a lasing cavity of differing length, resulting in spectrally different optical signals as illustrated in FIG. 1B, for example.

Each of the terms "lasing cavity" and "laser cavity," as used herein, generally refers to a system (typically a structure or a region) for circulating light through one medium or multiple media that amplify light to produce laser light. Circulating light can comprise reflecting light back and forth, resonating light waves, setting up a standing light wave, establishing a resonant pattern of electromagnetic radiation, feeding light back on itself, or running light through a circuit (one, two, or three dimensional) so the light circles, folds, or loops back on itself, for example. Geometrically, a lasing cavity or a laser cavity can be linear, circular, figure eight, or spherical, to mention a few possibilities. A laser cavity or a lasing cavity can be an arrangement (typically but not necessarily of mirrors or other reflectors) for inducing a material to produce laser light via feedback of laser light. A laser cavity or a lasing cavity can be an optically resonant structure in which lasing activity begins when multiple light passes (or light reflections) accumulate electromagnetic field intensity. Thus, a typical laser cavity or lasing cavity of a laser is a region of the laser in which light sets up a wave that is substantially standing in support of light amplification by stimulated emission of radiation. The usage of these terms herein and the explanation in the present paragraph are believed to be consistent with current, generally accepted industry terminology.

The laser die 925 can comprise an active semiconductor material, a light amplification material, a III-V semiconductor material, silicon, doped silicon, InP, AlGaInAs, InP/InGaAsP, etc. In certain exemplary embodiments, the thin film layers of the front facet coating 975 and the rear facet coating 950 comprise silicon dioxide and tantalum pentaoxide. High index layers can comprise tantalum pentaoxide (e.g. $Ta_2O_5$), and low index layers can comprise silicon dioxide ($SiO_2$). The high index layers can be interleaved between the low index layers (or vice versa). With this material system, the spectral characteristics of the front facet coating 975 and the rear facet coating 950 can remain substantially uniform across an operating temperature range of the laser 105. Accordingly, the front facet coating 975 and the rear facet coating 950 can provide mirrors with spectral properties that are substantially temperature invariant (across a specified operating temperature), for example.

In the illustrated embodiment, the modulator 902 feeds an electrical signal to the laser die 925 that is encoded with digital or analog information. In this direct modulated configuration, the laser die 925 emits light that conveys information, for example as illustrated in FIG. 3 and discussed above.

Referring to FIG. 9B, this figure illustrates a perspective view of an exemplary laser 105B providing another exemplary embodiment for the lasers 105 illustrated in FIG. 1 and discussed above. The laser 105B comprises a laser die 905 comprising a ridge waveguide structure 915 for guiding light between opposing laser facets providing a lasing cavity for producing an optical signal 125 that includes multiple modes 105. The modes 105 typically are organized in a spectral pattern. As discussed above, that pattern can support adding, dropping, multiplexing, demultiplexing, etc. via ring resonators 450, etalons, or other appropriate technology, for example. The laser die 905 can comprise an active semiconductor material or light amplification material such a III-V semiconductor material, silicon, doped silicon, InP, AlGaInAs, InP/InGaAsP, etc.

Referring to FIG. 9C, this figure illustrates a perspective view of an exemplary laser 105C comprising a VCSEL die 942 coated with a system of optical thin films for mode management according to certain embodiments of the present invention. The laser 105C can provide another exemplary embodiment of the lasers 105 illustrated in FIG. 1 and discussed above.

The gain medium 965 of the VCSEL die 942 is sandwiched between a stack 955 of thin films of alternating refractive index materials adjacent the exit port 945 and another stack 970 of thin films of alternating refractive index materials. To promote temperature insensitivity of the stacks 955 and 970, the alternating refractive index materials can be silicon dioxide and tantalum pentaoxide as discussed above with reference to FIG. 9A. Accordingly, temperature insensitive mirrors can form the laser cavity of the laser 105C. Alternatively, the mirrors can be temperature sensitive.

Figure 9D:
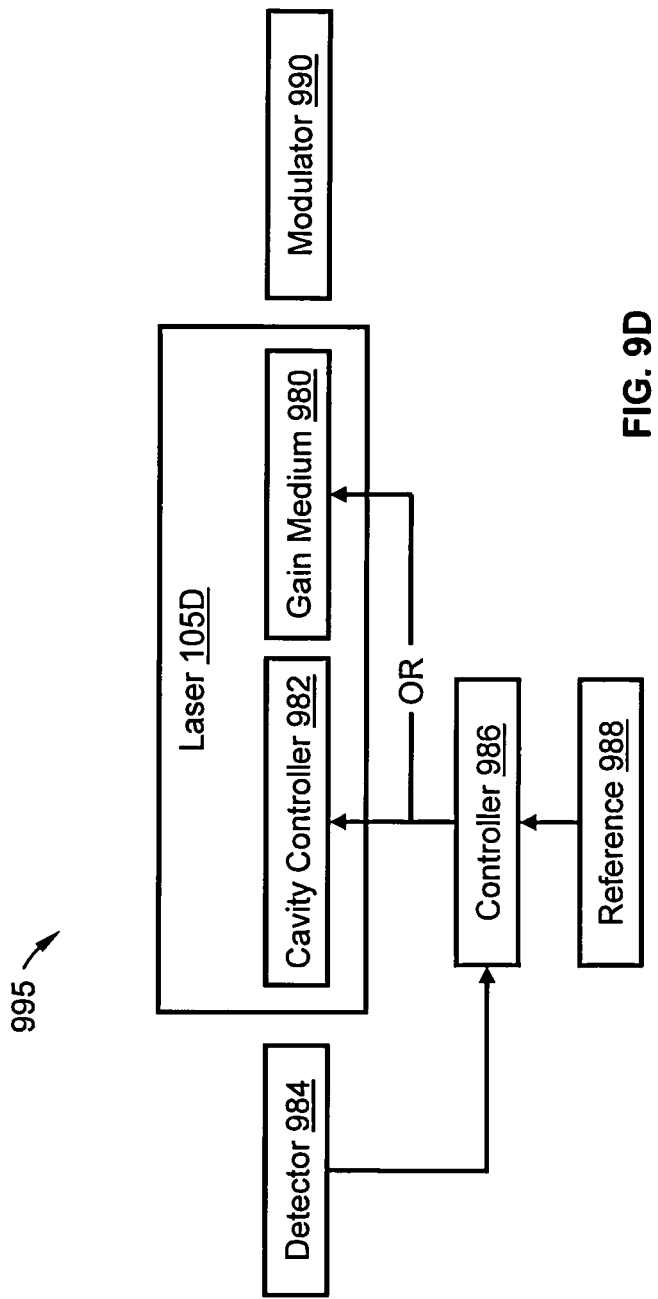
Figure 10:
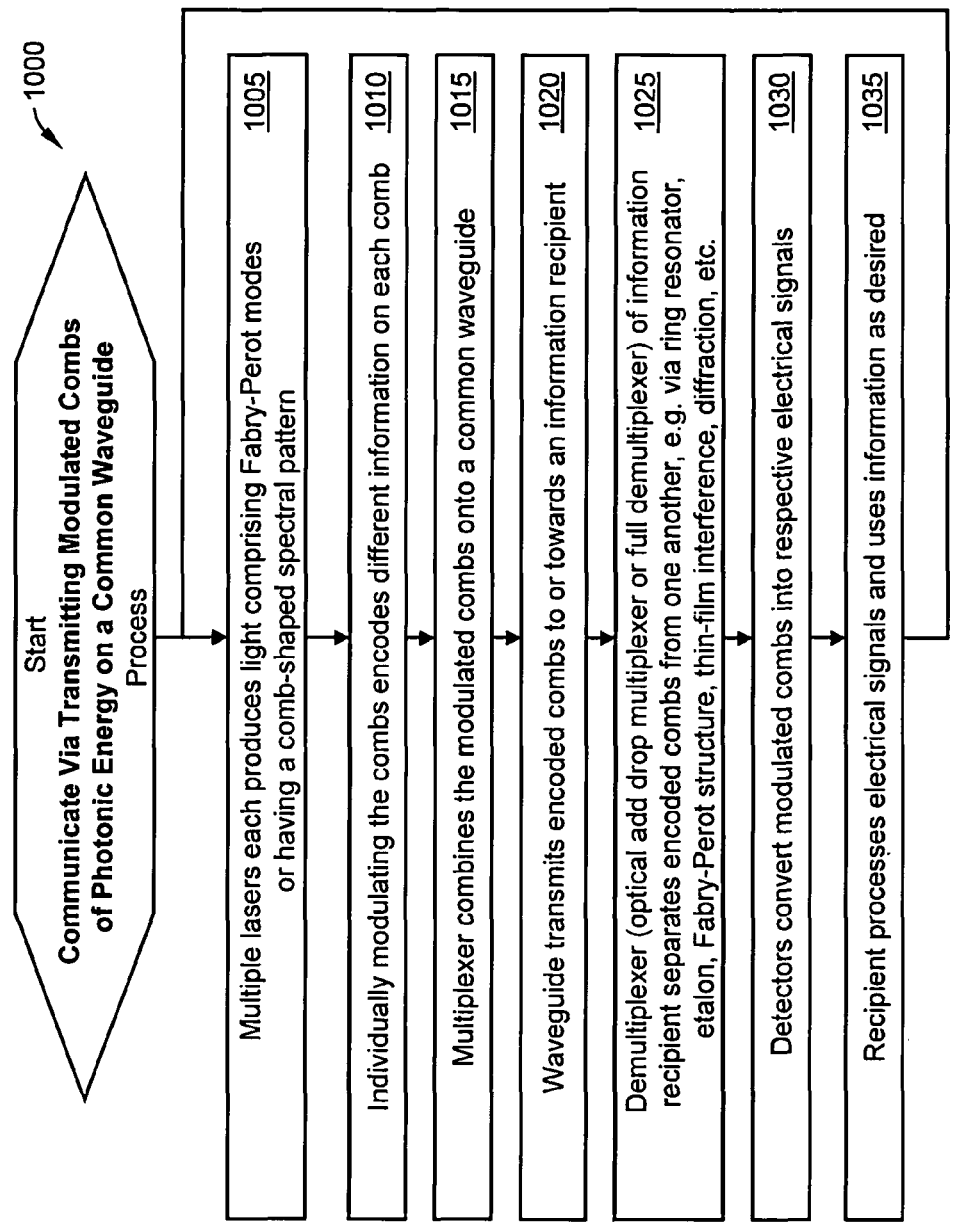
FIG. 10 is a flowchart of a process for optical communication in accordance with certain exemplary embodiments of the present invention.

Referring to FIG. 9D, this figure illustrates a functional block diagram of an exemplary laser system 995 comprising the laser 105D. The laser system 995 and/or the laser 105D provide another exemplary embodiment of the laser 105 illustrated in FIG. 1 and discussed above.

The laser system 995 comprises a modulator 990 that encodes or imprints information on light emitted by the laser 105D via modulating that light. The modulator 990 can comprise an external modulation device, a Mach-Zehnder interferometer, a lithium niobate modulator, or an electro-absorption modulator ("EAM"), for example. The modulator 990 can receive symbols, bits, characters, or some other form of analog or digital information (typically but not necessarily arriving electrically) and output corresponding current and/or voltage signals suitable for modulating information on laser light.

In the illustrated embodiment, the laser 105D comprises a gain medium 980 that amplifies light and a cavity controller 982 for manipulating the spectral pattern of light emitted by the laser 105D. In certain exemplary embodiments, the cavity controller 982 can comprise an etalon or other appropriate interference device for adjusting mode spacing and position. Such an etalon can have an optical thickness that defines the free spectral range 225. The cavity controller 982 can further comprise a heater, active cooler, or thermal regulator for adjusting the optical thickness to set the free spectral range 225 and/or the spectral positions of the modes 150 as desired.

In certain exemplary embodiments, the cavity controller 982 can comprise a thermal electric cooler, a heater, or a thermal regulator that controls the length of a lasing cavity encompassing the gain medium 980. For example, the gain medium 980 can comprise a semiconductor optical amplifier or a Fabry-Perot laser die having a reflective front facet and a rear facet treated with an antireflective coating and/or angled to suppress rear facet reflection. The lasing cavity can thus extend from the front facet, through the rear facet, and to an external reflector (not illustrated). The cavity controller 982 effectively moves the external reflector to set the length of the lasing cavity and thus the free spectral range 225 and/or the spectral positions of the modes 150. Such motion can be effected thermally, wherein heat expands the cavity length and cold contracts the length (or vice versa for certain material systems).

The detector 984 monitors optical power and can also monitor spectral characteristics, including free spectral range 225 and/or spectral position of the modes 150. In certain exemplary embodiments, the detector 984 comprises a spectrum analyzer, a dispersive grating, a spectrograph, or a spectrometer. In certain exemplary embodiments, the detector 984 comprises a light separation unit for observing discrete wavelengths or discrete wavelength windows.

A reference 988 provides one or more known wavelength and may be implemented via wavelength reference technology common to "wavelength lockers" conventionally applied in certain types of conventional DWDM lasers, as will be appreciated by those of ordinary skill in the art having benefit of this disclosure.

In certain exemplary embodiments, the reference 988 comprises technology disclosed in U.S. Pat. No. 6,393,186 (referenced above) for creating a cavity with a temperature invariant free spectral range.

The controller 986 manages and/or adjusts the cavity controller 982 to provide a desired free spectral range 225 and/or desired spectral positions for the modes 150. The controller 986 can compare the spectral characteristics of the emitted light, as sensed by the detector 984, to the spectral characteristics of the laser 988 and control the laser 105D to achieve desired free spectral range 225 and/or spectral locations of the modes 150. In certain exemplary embodiments, the controller 982 can comprise an automatic control circuit or program, which may comprise at least one proportional plus integral ("PI") controller. In one exemplary embodiment, the controller 982 comprises a proportional plus integral plus derivative ("PID") controller. In various other exemplary embodiments, the controller 982 can comprise a Kalman filter, a stochastic filter, a deadbeat controller, a multivariate controller, a least-squares computation, an anti-reset windup provision, a feed forward correction, a digital controller, an analog controller, fuzzy logic, cascaded control, microprocessor-based control, or some other effective feedback control loop or appropriate automatic feedback control means. Certain exemplary embodiments of the controller 982 can utilize one or more of the technologies discussed in this paragraph for configuring the laser 105D to emit multimode light of desired spectral characteristics.

As an alternative to dynamically controlling the laser 105D to achieve desired spectral properties, in certain exemplary embodiments, the laser system 995 comprises technology as disclosed in U.S. Pat. No. 6,393,186 (referenced above) for providing a free spectral range 225 that is temperature invariant. Thus, in certain exemplary embodiments, the laser system 995 can output a light exhibiting a predefined free spectral range 225 and cavity mode distribution without active feedback or control.

Turning now to a more general discussion of exemplary laser technologies, in various exemplary embodiments, a laser 105, whether in accordance with FIG. 9 or FIG. 1 or FIGS. 1 and 9, can be or can comprise an appropriate form of a DFB laser, a DBR laser, a fiber-Bragg grating laser, a silicon laser, a Fabry-Perot laser, an injection laser, a VCSEL, a fiber laser, a Raman laser, a semiconductor laser, a bimodal laser, a Fabry-Perot laser, a locked laser, an external cavity laser, an extended cavity laser, a multiple quantum well ("MQW") laser, a laser that comprises a capped mesa buried heterostructure ("CBMH") grown on an n-type substrate with MQW active layers and a DFB grating layer, a diode laser, a quantum dot laser, a quantum dash, a silicon laser, a "silicon-photonic" laser, an optical pumped laser that can comprise silicon, a compound semiconductor laser, a strained quantum well laser, an edge emitting laser, a frequency doubling laser, a separate confinement hetrostructure quantum well laser, a buried hetrostructure diode laser, a quantum cascade laser, a multimode laser, a laser that lases at multiple longitudinal modes, or a laser that lases at multiple transverse modes as appropriate (not an exhaustive list).

In certain exemplary embodiments, such a laser 105 comprises a material platform for operating at about 1310 nm or 1550 nm. Such material platform may comprise InP—InGaAsP or GaAs—InGaAsN, for example. In certain exemplary embodiments, such a laser 105 comprises gallium aluminum arsenide for short wavelength operation or indium gallium arsenide phosphide ("InGaAsP") for long wavelength operation. In certain exemplary embodiments, such a laser 105 can comprise indium phosphide (InP) that can be adapted to provide a tailored gain profile.

In one exemplary embodiment, such a laser 105 comprises InAs/InP. In one exemplary embodiment, such a laser 105 comprises InGaAsP/InP. In one exemplary embodiment, such a laser 105 comprises a MQW laser diode. In one exemplary embodiment, such a laser 105 comprises InGaAsP/InP. In one exemplary embodiment, such a laser 105 comprises a MQW DFB laser. In one exemplary embodiment, such a laser 105 comprises InGaAsP/InP. In one exemplary embodiment, such a laser 105 comprises a MQW DBR laser. In one exemplary embodiment, such a laser 105 comprises GaAs. In one exemplary embodiment, such a laser 105 comprises GaAs/AlGaAs. In one exemplary embodiment, such a laser 105 comprises AlInGaAs. In one exemplary embodiment, such a laser 105 comprises InGaAsP. In one exemplary embodiment, such a laser 105 comprises InGaAs material and quantum dots. In one exemplary embodiment, such a laser 105 comprises GaInN(Sb)As. In one exemplary embodiment, such a laser 105 comprises AlGaAsSb. In one exemplary embodiment, such a laser 105 comprises InP base material with InGaAsP layers manufactured by molecular beam epitaxy ("MBE") or metal organic chemical vapor deposition ("MOCVD"). In one exemplary embodiment, such a laser 105 is a VCSEL comprising AlGaAs and operating in an 850 nm region of the light spectrum. In one exemplary embodiment, such a laser 105 comprises a distributed feedback laser comprising InP and operating in a 1550 nm region of the light spectrum, for example in the region in which fiber optic light attenuation associated with water absorption dips to a local minimum. In one exemplary embodiment, such a laser 105 comprises a multimode distributed feedback laser comprising InP and operating in a 1310 nm region of the light spectrum, for example in the region in which fiber optic light attenuation associated with water absorption dips to a local minimum. In one exemplary embodiment, such a laser 105 comprises a strained quantum well laser comprising InGaAs operating in a 905 nm region of the light spectrum. In certain exemplary embodiments, such a laser 105 comprise more than one of the laser technologies or materials described in this paragraph. Further, such a laser 105 can comprise appropriate combinations of the material systems or technologies discussed in this paragraph.

Certain exemplary lasing material systems can comprise selected combinations of the following materials: InGaAsP (1-1.8 microns), GaAsSb (1-1.6 microns), AlGaAs (0.7-0.9 microns), GaAsP (0.6-1 microns), AlGaInP (0.6-0.7 microns), InGaAs (0.6-3 microns), GaInN (0.35-0.7 microns), and/or CdZnS (0.3-0.5 microns), for example.

In certain exemplary embodiments of the present invention, a laser 105 in accordance with one or more of the embodiments illustrated in FIG. 9 (or otherwise disclosed herein) is packaged in a TO-can-style enclosure or a TO can or other package suitable for soldering or attachment to a circuit board, "blade," or other system. In many such embodiments, such a package may comprise an aperture through which light can pass. Such an aperture can accommodate an optical fiber or an expanded-beam or integrated-optic optical element. In certain embodiments, such an aperture can be outfitted with a lens or other optical component, for example one or more diffractive elements, holographic lenses, concave lenses, convex lenses, cylindrical lenses, Fresnel lens, planar lightguide circuit features, prisms, circulators, isolators, lens arrays, ball lenses, micro-optic components, nano-optic elements, planar micro-lenses, plano-convex lenses, convex-convex lenses, ion-exchanged components, interconnects, crystals, lenslets, or other suitable active or passive components for manipulating light.

Moreover, a package or enclosure can comprise a port through which light passes. The term "port," as used herein, generally refers to a place of entry or exit, a passageway, an inlet or an outlet, an entrance or an exit, an input or an output, a connection, a connection point, a passage, or a line through which signals (optical, electrical, etc.) or data transmit into and/or out of a device or a system.

In accordance with certain exemplary embodiments, a package for a laser, laser device, or lasing system as discussed above can have a geometric form of a butterfly-type package, a dual inline pin ("DIP") package, a dual inline ("DIL") packages, a "mini DIL" package, a "XENPAK" package, an "XPAK" package, an "X2" package, a "small form-factor pluggable" ("SFP") package, an "XFP" package, a TO-can, a TO-56 header package, an industry-standard package, a MCM package, a package conforming to a multi-source agreement ("MSA"), or some other appropriate package style or form factor, for example.

Turning now to FIG. 10, this figure illustrates a flowchart of an exemplary process 1000 for optical communication according to certain embodiments of the present invention. Process 1000, which is entitled Communicate Via Transmitting Modulated Combs of Photonic Energy on a Common Waveguide, will be discussed with exemplary reference to certain ones of the above described embodiments and figures. However, it will be appreciated that process 1000 can operate with many other embodiments or applications, without limitation.

Certain steps in process 1000, as well as in the other processes and methods disclosed or taught herein, may naturally need to precede others for the present invention to function as described. However, the present invention is not limited to the order of the steps described if such order or sequence does not adversely alter the functionality of the present invention to the extent of rendering the invention inoperable or nonsensical. That is, it is recognized that some steps may be performed before or after other steps or in parallel with other steps without departing from the scope and spirit of the present invention.

At step 1005 of process 1000, multiple lasers 105 produce light. The light from each laser 105 comprises Fabry-Perot modes or exhibits a comb-shaped spectral pattern. For example, each of the lasers 105 illustrated in FIG. 1 can output or produce light in accordance with the graph 700 illustrated in FIG. 7 and discussed above.

At step 1010, modulation encodes or imprints information or data on the light produced by each of the lasers 105, typically such that the light of each laser 105 conveys distinct information. For example, either the modulator 902 illustrated in FIG. 9A or the modulator 990 illustrated in FIG. 9D can produce an optical signal 125A as illustrated in the graph 300 of FIG. 3. Accordingly, the lasers 105 can produce the optical signal 125A, 125B, 125C, 125D, 125E, 125F, each carrying different information or data via analog, digital, or discrete modulation.

At step 1015, the multiplexer 135 combines the optical signals 125A, 125B, 125C, 125D, 125E, 125F and feeds the combination of the optical signals 125A, 125B, 125C, 125D, 125E, 125F onto a common waveguide, optical fiber, transmission medium, or light path, for example the transmission optical waveguide 110. As discussed above with reference to FIG. 4, in certain embodiments the multiplexer 135 can comprise a system of ring resonators 450 for multiplexing. Alternatively, the multiplexer 135 can comprise expanded beam optics or integrated optics based on an appropriate technology other than ring resonator technology.

At step 1020, the waveguide, in this example the transmission optical waveguide 110, carries the optical signals 125A, 125B, 125C, 125D, 125E, 125F towards or to one or more recipients. As discussed above, in certain exemplary embodiments, an optical add-drop multiplexer can be disposed in or on a span of the transmission optical waveguide 110 for dropping one or more of the optical signals 125A, 125B, 125C, 125D, 125E, 125F. As illustrated in FIGS. 1B and 1C, the optical signals 125A, 125B, 125C, 125D, 125E, 125F reach the demultiplexer 140.

At step 1025, the demultiplexer 140 separates or segregates the optical signals 125A, 125B, 125C, 125D, 125E, 125F. As illustrated in FIG. 5 and discussed above, in certain exemplary embodiments, the demultiplexer 140 can comprise a system of ring resonators 450 for demultiplexing.

At step 1030, the optical signals 125A, 125B, 125C, 125D, 125E, 125F are converted from the optical domain to the electrical domain. For example, each of the detectors 115 illustrated in FIG. 1C and discussed above can receive a respective one of the optical signals 125A, 125B, 125C, 125D, 125E, 125F and output a corresponding electrical signal carrying the information encoded at step 1010 as discussed above.

At step 1035, a recipient device processes the electrical signals to use the encoded information or data as desired. In certain exemplary embodiments, the recipient can comprise an access terminal, a fiber-to-the-home ("FTTH") interface, or an interface for fiber-to-the-curb (FTTC), fiber-to-the-node, fiber-to-the-business ("FTTB"), fiber-to-the-whatever ("FTTX"), fiber-to-the-building ("FTTB"), fiber-to-the-premises ("FTTP"), fiber-to-the-desktop ("FTTD"), to mention a few examples. The recipient could also comprise a synchronous optical network ("SONET") or SDH network terminal or device; a passive optical networking ("PON") device or system; a networking element of a local area network ("LAN"), a wide area network ("WAN"), a metropolitan area network ("MAN"), an access network, or a fiber optic backhaul network for a cellular wireless system; a ultra-short reach or short reach optical interconnect; a backplane; a fiber optic bus; or some other appropriate optical communication link, system, or network, for example.

The disclosure and teachings presented herein would enable one of ordinary skill in the art to utilize instances, variations, and adaptations of the optical communication system 110 for a broad variety of optical networking systems, optical communication applications, and communication or computing devices. Such systems and applications can include WANs, LAN, MANs, FTTH, FTTC, FTTX, FTTP, access networks, intra-cabinet communications, inter-cabinet communications, backplane communications, intra-computer communications, inter-computer communications, intra-core communications, inter-core communications, buses for digital signal processors ("DSPs"), buses for systems on a chip ("SOCs"), chip-to-chip optical interconnects, core-to-core optical interconnects, timing busses, optical links between or among features on a single chip, optical lines in multi-chip modules ("MCMs") and microprocessor buses, to mention a few representative examples without limitation. Further, embodiments of the optical communication system 110 can be part of a larger network that may span across a country, a state, or a significant geographic region. Appropriately outfitted using ordinary skill and the present disclosure without undue experimentation, the optical communication system 110 can connect nodes or sites within a LAN, a home network, an FTTH network, an access network, or one or more communication links within a local area (not an exhaustive list). Certain embodiments of the optical communication system 110 can be essentially or substantially contained within a single piece of equipment, in a single enclosure, or in a singe board-mountable package such as a DIP package.

Following step 1035, process 1000 can iterate to continue communicating information optically, such as between or among one or more senders and one or more recipient.

As discussed above, exemplary embodiments of the optical communication system 100 and/or the underlying technology can be benefit a wide range of applications and systems. In certain embodiments, the laser 105 and the detector 115 are sufficiently close to one another to avoid signal degradation due to chromatic dispersion. (Alternatively or additionally, the transmission medium can be have low dispersion or be "dispersion shifted" so a dispersion valley substantially coincides with a spectral region in which modes 150 of the optical signals the optical signals 125A, 125B, 125C, 125D, 125E, 125F are energized.) A representative application and system will now be discussed below with reference to FIG. 11, which illustrates an exemplary optical networking system for a multicore processing system according to certain embodiments of the present invention.

Figure 11A:
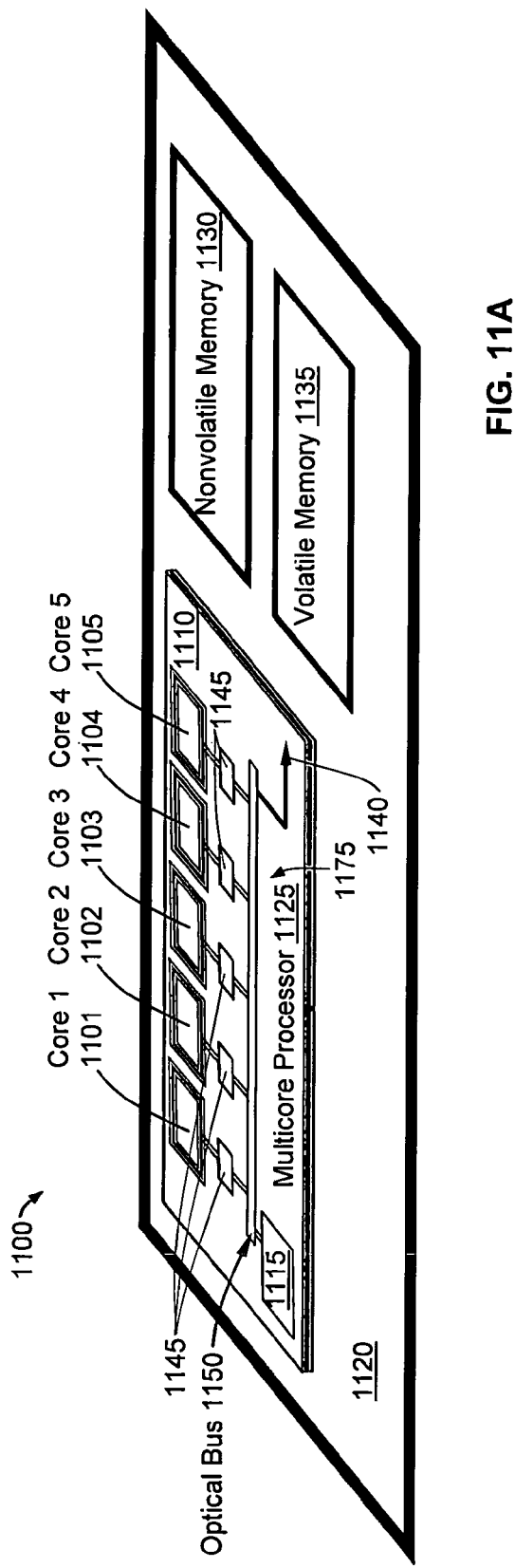
FIGS. 11A, 11B, and 11C (collectively FIG. 11) are illustrations of an optical networking system for a multicore processing system in accordance with certain exemplary embodiments of the present invention.

Referring now to FIG. 11A, this figure illustrates a microprocessor system 1100 comprising a multicore processor

1125 that includes an exemplary optical network 1175 according to certain embodiments of the present invention. The optical network 1175 can comprise the optical communication system 100 illustrated in FIG. 1 or components thereof or a variant formed in accordance with the present disclosure and ordinary skill and without undue experimentation.

The microprocessor system 1100 could be a computing system or engine for a personal computer, a laptop, a minicomputer, a router, a communication terminal, a handheld computer, a router, a special purpose computer, an optical network unit ("ONU"), an optical network terminal ("ONT"), an optical line terminal ("OLT"), a SONET terminal, a WDM, DWDM, or CWDM node, a cellular telephone, a workstation, a gaming device, or some other appropriate computing, communication, or entertainment system or apparatus, for example. Accordingly, a wide variety of a larger systems can comprise the microprocessor system 1100.

In the exemplary embodiment that FIG. 11A illustrates, the optical network 1175 transmits information to, from, between, and/or among multiple cores 1101, 1102, 1104, 1105 via an optical bus 1150. The optical network 1175 can comprise a short range optical interconnect or an ultra short range optical interconnect, for example. In accordance with certain exemplary embodiments, the optical bus 1150 comprises the transmission optical waveguide 110 illustrated in FIG. 1 and discussed above.

The multicore processor 1125 exchanges information with the nonvolatile memory 1130 and the volatile memory 1135 via the communication line 1140, for example accessing/obtaining programming instructions, code, data, etc. Accordingly, the communication line 1140 typically provides a link between the multicore processor 1125 and the volatile and nonvolatile memories 1130, 1135.

As illustrated, the exemplary microprocessor system 1100 comprises a substrate 1120 supporting the multicore processor 1125, volatile memory 1135, and nonvolatile memory 1130. The substrate 1120 can comprise a motherboard, with the volatile memory 1135 and the nonvolatile memory 1130 comprising respective daughter boards. In certain exemplary embodiments, the substrate 1120 comprises a ceramic wafer or plate upon which the other illustrated components are mounted in a unitary package. The substrate 1120 can also comprise a slide-in board or a blade, for example. In some exemplary embodiments, the volatile memory 1135, the nonvolatile memory 1130, and the multicore processor 1125 are mounted via ball grid array ("BGA") technology, a "pin grid array" system, surface mounting, solder, etc. Alternatively, the volatile memory 1135, the nonvolatile memory 1130, and the multicore processor 1125 can be grown on the substrate 1120. The microprocessor system 1100 can be a monolithic device. In certain exemplary embodiments, the microprocessor system 1100 can be a very large scale integrated ("VLSI") chip or a component thereof. In certain exemplary embodiments, the volatile memory 1135, the nonvolatile memory 1130, and the multicore processor 1125 can be or can comprise features on the substrate 1120, created via photolithography, for example.

In certain exemplary embodiments, the optical network 1175 is disposed on or is attached to a single substrate 1110, for example to connect cores 1101, 1102, 1104, 1104, 1105 of the multicore processor 1125 or computing elements of a larger microprocessor system (or computing processor). Such a singe substrate 1110 can comprise (or substantially consist of) silicon, for example in a "silicon-on-insulator" format, or can comprise a monolithic platform or a single crystal of material.

In one exemplary embodiment, the optical network 1175 can comprise a unitary optical path that links two users/user devices together, without supporting additional user connections. As one more example out of many possibilities, the optical network 1175 may provide one or more optical interconnects or optical links for a backplane or an optical bus that transmits information within communications or computing equipment.

In one exemplary embodiment, the multicore processor 1125 and/or the microprocessor system 1100 comprises multiple components, elements, or material systems in a common enclosure or housing. Such an enclosure or housing can comprise a MCM package, a plug-in module, or a BGA system, for example. The multicore processor 1125 and/or the microprocessor system 1100 can comprise various discrete electrical, digital, electronic, optical, and optoelectronic components. In certain exemplary embodiments, optical, optoelectronic, and electrical circuitry elements discussed below are provided in a common material system such as lithium niobate, silicon, or indium phosphide. Furthermore, those optical, optoelectronic, and electrical circuitry elements can be grown on a common substrate 1110 and/or monolithic. In one exemplary embodiment, the multicore processor 1125 comprises a PLC or PIC or an integrated photonic system. A PLC or a PIC can provide a platform for the multicore processor's optical, optoelectronic, and electrical circuitry elements, as discussed below.

In certain exemplary embodiments, components of the multicore processor 1125 can be mounted on a substrate 1110, such as a plate, block, sheet, wafer, or slab of material, having a composition of glass, silica, sapphire, aluminum oxide, ceramic, or silicon, for example. In one exemplary embodiment, those components are integrated in or grown on a semiconductor material, such as a silicon-based material, InGaAs, germanium, InP, III-V material, III-V semiconductor material, etc. Those components can be either monolithically integrated or hybrid integrated, for example. Moreover, they can be grown on, embedded in, or bonded to a common substrate 1110. Accordingly, the multicore processor's optical, optoelectronic, and/or electronic components can be a unitary structure, a monolithic system, a "chip," or a collection of elements fastened or bonded together.

The multicore processor 1125 comprises multiple cores 1101, 1102, 1103, 1104, 1105 to implement multiprocessing in a single package or on a single system. In an exemplary embodiment, the multicore processor 1125 can be a central processing unit ("CPU"). Alternatively, the microprocessor system 1100 can be a CPU, with the multicore processor 1125 being a heart of the CPU. In an exemplary embodiment, each of the cores 1101, 1102, 1103, 1104, 1105 may implement optimization, for example multithreading, pipelining, or superscalar execution. Such multithreading can comprise having two or more threads of execution, each providing a way for a program to fork to multiple tasks that are running simultaneously, substantially simultaneously, or pseudo-simultaneously. Different threads and processes can run literally simultaneously on each of the different cores 1101, 1102, 1103, 1104, 1105. That is, one of the cores 1101, 1102, 1103, 1104, 1105 can run one thread or process, while another of the cores 1101, 1102, 1103, 1104, 1105 runs another thread or process.

In certain exemplary embodiments, the cores 1101, 1102, 1103, 1104, 1105 are all on a single die, so that the multicore processor 1125 is a monolithic processor. Moreover, the optical network 1175, the optical bus 1150, and the bus interfaces 1145 (discussed below) can be on the single die, so that the complete multicore processor 1125 is monolithic or grown on a common substrate 1110 of silicon or other suitable material. The multicore processor 1125 can be a VLSI chip, for example. The multicore processor 1125 can comprise a substrate 1110 with a substantially flat or planar surface or face, with the optical network 1175, the optical bus 1150, and the bus interfaces 1145 attached thereto. In some exemplary embodiments, each of the cores 1101, 1102, 1103, 1104, 1105 is a discrete element attached to a substrate 1110, while in other exemplary embodiments, each of the cores 1101, 1102, 1103, 1104, 1105 comprises chip-level features defined on a common substrate 1110, for example via photolithography.

As will be discussed in further detail below, the optical network 1175 comprises the optical bus 1150 that supports communications between, among, or with each of the cores 1101, 1102, 1103, 1104, 1105 as well as the cache 1115 and the communication line 1140. In other words each of the cores 1101, 1102, 1103, 1104, 1105 can send and/or receive information over the optical bus 1150. Thus, the optical bus 1150 provides one or more communication channels that can comprise an embodiment of the transmission optical waveguide 110 illustrated in FIG. 1 and discussed above. Instances of the optical signals 125A, 125B, 125C, 125D, 125E, 125F flowing over the optical bus 1150 can coordinate or synchronize operations of the cores 1101, 1102, 1103, 1104, 1105; allocate processing jobs, threads, tasks, or pipelines among the cores 1101, 1102, 1103, 1104, 1105; deliver timing pulses; communicate processing results or inputs; or provide some other appropriate information, data, or support for operating the multicore processor 1125.

In one exemplary embodiment, the bus interfaces 1145 may comprise core identifiers for identifying each of the cores 1101, 1102, 1103, 1104, 1105 for the optical bus 1150. In other words, each bus interface 1145 can specify a unique network address of its associated core 1101, 1102, 1103, 1104, 1105. In one exemplary embodiment, each bus interface 1145 comprises an optical element, such as a grating with unique spectral properties for such identification.

In certain exemplary embodiments, each bus interface 1145 assigns or provides one or more optical channels 625 (see FIG. 6A) to a respective one of the cores 1101, 1102, 1103, 1104, 1105. In certain exemplary embodiments, each bus interface 1145 comprises an optical add-drop multiplexer based on ring resonator filtering system 600, for example as illustrated in FIG. 6. In certain exemplary embodiments, each bus interface 1145 comprises an instance of the optical add-drop multiplexing device 800 illustrated in FIG. 8 and discussed above or some other appropriate embodiment in accordance with this disclosure. In certain exemplary embodiments, each bus interface 1145 comprises a demultiplexer 140 and further can comprise a multiplexer 135, either of which may operate on a subset or group of optical channels 650 or optical signals 125A, 125B, 125C, 125D, 125E, 125F (or on all optical channels 650 or optical signals 125A, 125B, 125C, 125D, 125E, 125F).

In certain exemplary embodiments, each bus interface 1145 can provide identification from the electrical domain. For example, each bus interface 1145 can comprise a system of electrical circuitry that provides a core ID register. More generally, each bus interface 1145 (respectively denoted 1145A, 1145B, 1145C, 1145D, 1145E in FIG. 2) provides its associated core 1101, 1102, 1103, 1104, 1105 with an interface to the optical bus 1150 to support bus access, as described in further detail below.

Figure 11B:
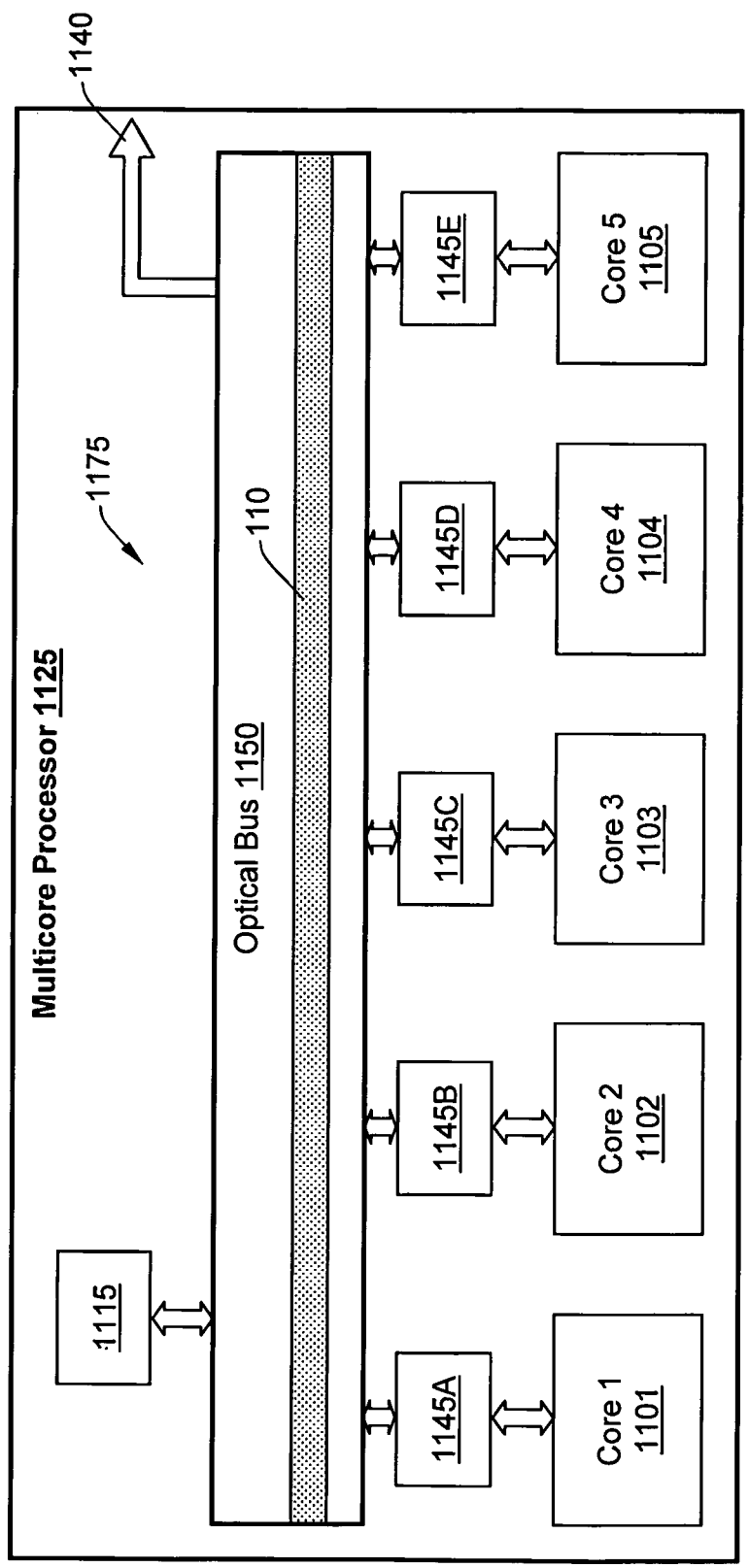

Referring now to FIG. 11B, this figure illustrates a functional block diagram of an exemplary multicore processor 1125 comprising cores 1101, 1102, 1103, 1104, 1105 attached to an optical network 1175 according to certain embodiments of the present invention. In an exemplary embodiment, FIG. 11B illustrates the multicore processor 1125 of FIG. 11B in further detail. In other words, FIG. 11B provides an exemplary block diagram for an exemplary embodiment of the multicore processor 1125 that FIG. 1 illustrates as discussed above. However, in certain exemplary embodiments, FIG. 11B can stand alone with respect to FIG. 11A. Although FIG. 11B illustrates the optical bus 1150 comprising exactly one transmission optical waveguide 110, in certain exemplary embodiments, the optical bus 1150 can comprise two, three, five, ten, or an array of transmission optical waveguides 110.

Figure 11C:
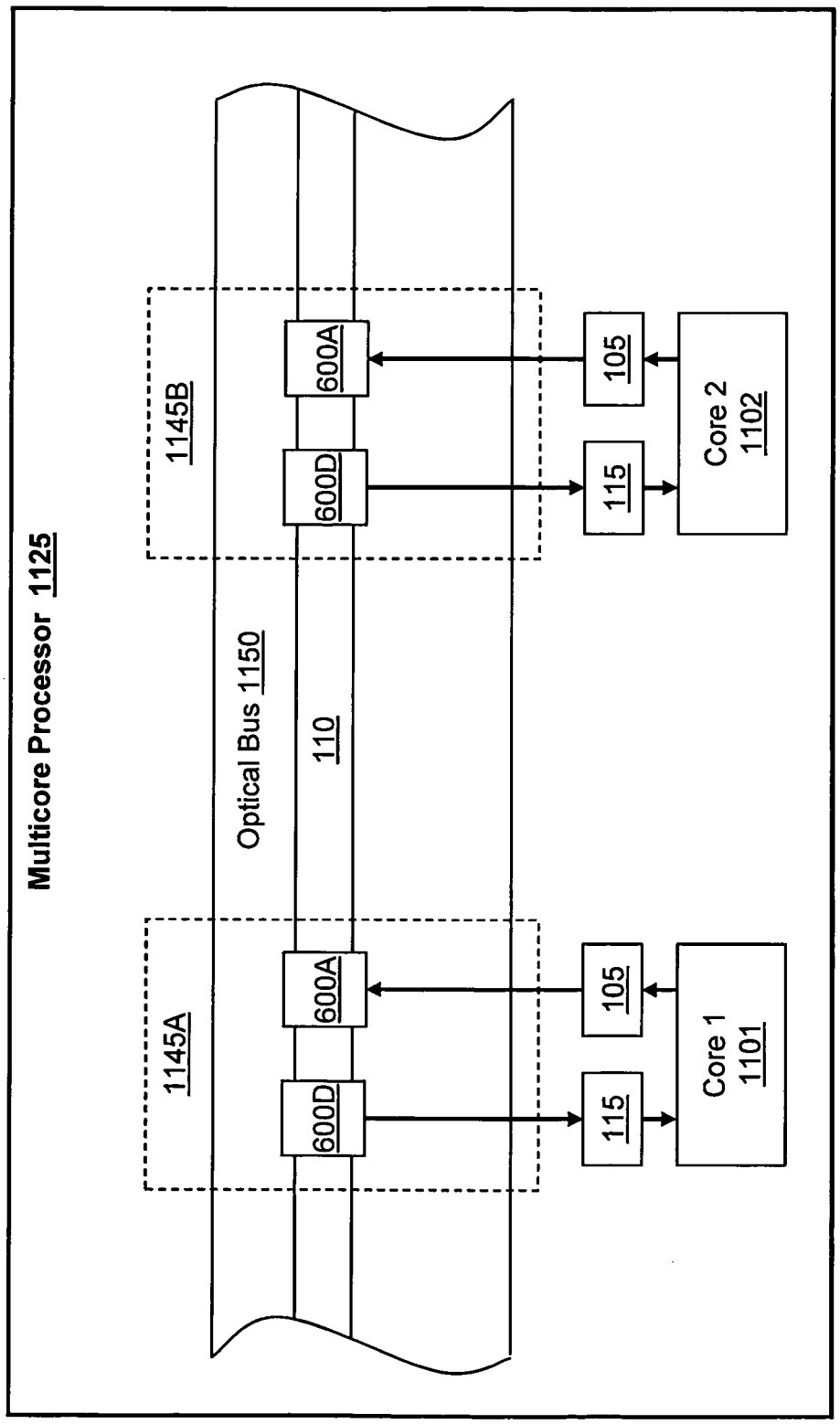

Turning now to FIG. 11C, this figure illustrates a functional block diagram of an exemplary section of an optical network 1175 comprising an optical bus 1150 that comprises a transmission optical waveguide 110 extending between multiple cores 1101, 1102 of a multicore processor 1125 according to certain embodiments of the present invention. FIG. 11C specifically illustrates a section of the optical bus 1150 that extends between and beyond core 1 1101 and core 2 1102. FIG. 11C can be viewed as a schematic-type diagram illustrating an exemplary embodiment of the multicore processor 1125 illustrated in FIGS. 11A and 11B (or FIG. 11B only or FIG. 11A only) as discussed above. However, in certain exemplary embodiments, FIG. 11C can stand alone with respect to FIGS. 11A and 11B.

A pair of ring resonator filtering systems 600D, 600A forms a bus interface 1145A, 1145B for each core 1101, 1102 and is coupled to or disposed in the optical path of the transmission optical waveguide 110. The ring resonator filtering system 600D functions as a optical drop filter, whereas the ring resonator filtering system 600A functions as an optical add filter. Accordingly, each pair 600D, 600A feeds an optical signal 125A, 125B, 125C, 125D, 125E, 125F off the optical bus 1150 and feeds an optical signal 125A, 125B, 125C, 125D, 125E, 125F onto the optical bus 1150. Typically, the information feeding on will be different than the information feeding off.

Each of the cores 1101, 1102 has an associated detector 115 for converting the output of the ring resonator filtering system 600D from the optical domain into the electrical domain to facilitate core receipt and processing. Each of the cores 1101, 1102 also has an associated laser 105 to facilitate emitting optical signals 125A, 125B, 125C, 125D, 125E, 125F onto the optical bus 1150 and specifically the transmission optical waveguide 110. The core 1 1101 and the core 2 1102 use the optical bus 1150 and the optical waveguide 110 to transmit and receive information via the bus interface 1145A and the bus interface 1145B respectively. Accordingly, each core 1101, 1102 can have an associated transmitter and an associated receiver and/or an associated transceiver.

The term "transceiver," as used herein, generally refers to a system that receives optical communication signals and transmits optical communication signals, each conveying distinct information. Receiving optical communication signals often comprises converting or transferring information from the optical domain to the electrical domain. Transmitting optical communication signals often comprises converting or transferring information from the electrical domain to the optical domain. Accordingly, in an exemplary transceiver, optically encoded information may become electrically encoded information, and electrically encoded information may become optically encoded information.

Technology useful for multiplexing optical signals has been described. From the description, it will be appreciated that an embodiment of the present invention overcomes limitations of the prior art. Those skilled in the art will appreciate that the present invention is not limited to any specifically discussed application or implementation and that the embodiments described herein are illustrative and not restrictive. Furthermore, the particular features, structures or characteristics that are disclosed may be combined in any suitable manner in one or more embodiments based on this disclosure and ordinary skill. Those of ordinary skill having benefit of this disclosure can make, use, and practice a wide range of embodiments via combining the disclosed features and elements in many permutations without undue experimentation. This disclosure not only includes the illustrated and described embodiments, but also provides a rich and detailed roadmap for creating many additional embodiments using the various disclosed technologies, elements, features, and their equivalents. From the description of the exemplary embodiments, equivalents of the elements shown herein will suggest themselves to those skilled in the art, and ways of constructing other embodiments of the present invention will appear to practitioners of the art. Therefore, the scope of the present invention is to be limited only by the accompanying claims.

What is claimed is:

1. A system for communicating information over an optical transmission medium according to a multiplexing scheme, the system comprising:
   a first node that is operative to produce light for transmission on the optical transmission medium according to a scheme; and
   a second node that is operative to receive light transmitted over the optical transmission medium according to the scheme,
   wherein the scheme establishes a plurality of optical communication channels, each comprising a plurality of discrete and substantially discontinuous color bands collectively extending across a wavelength region, wherein the wavelength regions substantially overlay one another such that the color bands of each optical communication channel are substantially interspersed among the color bands of other optical communication channels,
   wherein the first node comprises:
      a lasing device that comprises:
      a gain medium;
      a cavity optically coupled to the gain medium; and
      an output port, optically coupled to the gain medium and the cavity, that is operative to emit light exhibiting a discrete and substantially discontinuous pattern of colors substantially matching the discrete and substantially discontinuous color bands of a selected one of the plurality of optical communication channels;
      a modulator, coupled to the lasing device, that is operative to modulate light of the selected optical communication channel; and
      a multiplexer, optically coupled to the output port, that is operative to combine the modulated light with modulated light of another one of the plurality of optical communication channels, wherein the multiplexer comprises a first closed loop resonator providing a comb-shaped filter response, and
   wherein the second node comprises:
      a demultiplexer that is operative to separate light of the selected optical communication channel from light of another one of the plurality of optical communication channels, wherein the demultiplexer comprises a second closed loop resonator providing a comb-shaped filter response; and
      a detector, operably coupled to the demultiplexer, that is operative to convert the separated light of the selected optical communication channel into an information bearing electrical signal.

2. The system of claim 1,
   wherein the plurality of optical communication channels comprises at least four optical communication channels,
   wherein the plurality of discrete and substantially discontinuous color bands comprises at least six color bands, and
   wherein each optical communication channel comprises a respective near infrared wavelength.

3. The system of claim 1,
   wherein the optical transmission medium comprises an optical waveguide substantially extending from the first node to the second node, and
   wherein the first node and the second node are physically separated from one another by less than about 50 meters.

4. The system of claim 1,
   wherein the first node is operably coupled to a first core of a multicore processor, and
   wherein the second node is operably coupled to a second core of the multicore processor.

5. The system of claim 1,
   wherein the gain medium and the cavity form a Fabry-Perot laser comprising semiconductor material, and
   wherein the modulator is operative to modulate via varying a level of energy feeding the gain medium.

6. The system of claim 1, wherein the gain medium comprises a semiconductor waveguide, and wherein the modulator comprises a Mach-Zehner interferometer.

7. The system of claim 1, further comprising a substrate upon which the first node, the second node, and the optical transmission medium are disposed.

8. A system for communicating information over an optical transmission medium according to a multiplexing scheme, the system comprising:
   a first node that is operative to produce light for transmission on the optical transmission medium according to a scheme; and
   a second node that is operative to receive light transmitted over the optical transmission medium according to the scheme;
   wherein the scheme establishes a plurality of optical communication channels, each comprising a plurality of discrete and substantially discontinuous color bands collectively extending across a wavelength region, wherein the wavelength regions substantially overlay one another such that the color bands of each optical communication channel are substantially interspersed among the color bands of other optical communication channels;
   wherein the first node comprises:
      a lasing device that comprises:
         a gain medium;
         a cavity optically coupled to the gain medium; and
         an output port, optically coupled to the gain medium and the cavity, that is operative to emit light exhibiting a discrete and substantially discontinuous pattern of colors substantially matching the discrete and substantially discontinuous color bands of a selected one of the plurality of optical communication channels;
         wherein a plurality of longitudinal modes of light forms the substantially discontinuous pattern of colors, wherein each of the plurality of longitudinal modes of light is substantially energized,
wherein the plurality of longitudinal modes of light exhibit a free spectral range corresponding to a physical dimension of the cavity,
a modulator, coupled to the lasing device, that is operative to modulate light of the selected optical communication channel; and
a multiplexer, optically coupled to the output port, that is operative to combine the modulated light with modulated light of another one of the plurality of optical communication channels, wherein the multiplexer comprises a first ring-shaped resonator, and
wherein the second node comprises:
a demultiplexer that is operative separate light of the selected optical communication channel from light of another one of the plurality of optical communication channels, wherein the demultiplexer comprises a second ring-shaped resonator; and
a detector, operably coupled to the demultiplexer, that is operative to convert the separated light of the selected optical communication channel into an information bearing electrical signal.

9. A method for communication, comprising the steps of:
modulating a first series of longitudinal modes of light according to first information, wherein the first series of longitudinal modes comprises a comb of first teeth,
modulating a second series of longitudinal modes of light according to second information, the second series of longitudinal modes substantially interleaved with the first series of longitudinal modes,
interleaving the first series of longitudinal modes with the second series of longitudinal modes using a filter comprising a comb of second teeth having flatter tips than the first teeth, and
communicating the first information and the second information via transmitting the first series and the second series over a common medium.

10. A method for communication, comprising the steps of:
modulating a first series of longitudinal modes of light according to first information;
emitting the first series of longitudinal modes of light from a first semiconductor laser;
modulating a second series of longitudinal modes of light according to second information, the second series of longitudinal modes substantially interleaved with the first series of longitudinal modes;
communicating the first information and the second information via transmitting the first series and the second series over a common medium; and
emitting the second series of longitudinal modes of light from a second semiconductor laser.

11. The method of claim 10, wherein longitudinal modes of the first series are spectrally spaced with respect to one another according to a first cavity of the first semiconductor laser, and
wherein longitudinal modes of the second series are spectrally spaced with respect to one another according to a second cavity of the second semiconductor laser.

12. The method of claim 10, wherein longitudinal modes of the first series exhibit first free spectral range substantially defined by the first semiconductor laser,
wherein longitudinal modes of the second series exhibit a second free spectral range substantially defined by the second semiconductor laser, and wherein the method further comprises interleaving the first series of longitudinal modes with the second series of longitudinal modes using at least one closed loop resonator.

13. A communication method, comprising the steps of:
producing a plurality of spectral combs of light with a respective plurality of lasers, the spectral combs substantially overlaying one another, wherein each spectral comb of light comprises a respective first free spectral range,
processing the plurality of spectral combs of light with a plurality of resonators, each resonator comprising a substantially closed loop and providing a respective second free spectral range substantially matching one of the first free spectral ranges, and
transmitting the plurality of overlaying spectral combs over an optical waveguide, each spectral comb conveying distinct data.

14. The communication method of claim 13, further comprising the steps of:
separating each of the transmitted plurality of overlaying spectral combs from one another; and
converting the separated plurality of spectral combs into respective electrical signals,
wherein a plurality of teeth of each spectral comb are substantially energized within a selected course or dense wavelength division multiplexing channel and are substantially suppressed within a substantially adjacent course or dense wavelength division multiplexing channel.

15. A communication method, comprising the steps of:
producing a plurality of spectral combs of light with a respective plurality of lasers, the spectral combs substantially overlaying one another,
wherein each of the plurality of lasers comprises a respective pair of optical interfaces that form teeth of one of the spectral combs of light via optical resonance,
separating a selected one of the spectral combs of light from the plurality of overlaying spectral combs of light with a ring-shaped resonator,
wherein the separated one of the spectral combs of light comprises a first finesse,
wherein the ring-shaped resonator provides a comb-shaped filter response comprising a second finesse, and
wherein the first finesse is substantially higher than the second finesse, and
transmitting the plurality of overlaying spectral combs over an optical waveguide, each spectral comb conveying distinct data.

16. The communication method of claim 15, wherein each spectral comb comprises a plurality of teeth that transfer energy substantially freely among one another and that are modulated substantially in unison.

17. The communication method of claim 15, wherein the spectral combs are substantially in a first dense wavelength division multiplexing channel, and wherein the method further comprising the steps of:
producing a second plurality of spectral combs of light, each encoded with substantially distinct information, in a second dense wavelength division multiplexing channel;
and transmitting the second plurality of spectral combs over the optical waveguide along with the plurality of substantially overlaying spectral combs.

* * * * *